US009443189B1

(12) United States Patent
Chelian et al.

(10) Patent No.: US 9,443,189 B1
(45) Date of Patent: Sep. 13, 2016

(54) BIO-INSPIRED METHOD AND APPARATUS FOR FEATURE DETECTION WITH SPIKING DYNAMICS

(71) Applicant: HRL Laboratories, LLC, Malibu, CA (US)

(72) Inventors: Suhas E. Chelian, Encino, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 274 days.

(21) Appl. No.: 13/742,346

(22) Filed: Jan. 16, 2013

Related U.S. Application Data

(60) Provisional application No. 61/589,766, filed on Jan. 23, 2012.

(51) Int. Cl.
*G06N 3/02* (2006.01)
(52) U.S. Cl.
CPC ........................................ *G06N 3/02* (2013.01)
(58) Field of Classification Search
None
See application file for complete search history.

(56) References Cited

U.S. PATENT DOCUMENTS

| 8,390,500 | B1 * | 3/2013 | Srinivasa | G06N 3/049 341/161 |
| 8,756,183 | B1 * | 6/2014 | Daily et al. | 706/20 |
| 2006/0115157 | A1 * | 6/2006 | Mori et al. | 382/190 |
| 2008/0152217 | A1 * | 6/2008 | Greer | G06N 3/04 382/155 |
| 2013/0132314 | A1 * | 5/2013 | Snider | 706/15 |

OTHER PUBLICATIONS

Wade et al, "Swat: A Spiking Neural Network Training Algorithm for Classification Problems", IEEE Transactions on Neural Networks, vol. 21, No. 11, Nov. 2010.*
Kim et al, "A Functional Hybrid Memristor Crossbar-Array/CMOS System for Data Storage and Neuromorphic Applications", American Chemical Society, Published: Dec. 5, 2011.*
Matsugu et al, "Convolutional Spiking Neural Network Model for Robust Face Detection", Proceedings of the 9th International Conference on Neural Information Processing (ICONIP'OS), vol. 2, pp. 660-664 vol. 2, Date of Conference: Nov. 18-22, 2002.*
Matsugu et al, "Convolutional Spiking Neural Network for Robust Object Detection with Population Code Using Structured Pulse Packets", Neural Information Procesing: Research and Development Studies in Fuzziness and Soft Computing, vol. 152, 2004, pp. 39-55.*

(Continued)

*Primary Examiner* — Stanley K Hill
*Assistant Examiner* — Ilya Traktovenko
(74) *Attorney, Agent, or Firm* — Tope-McKay & Associates

(57) ABSTRACT

Described is a system, method, and computer program product for feature detection with spiking dynamics. The system is configured to perform operations of first receiving an input pattern comprising a plurality of features. The input pattern is then translated into a spike-coded representation of the input pattern. The spike-coded representation of the input pattern is transferred to a feature detector layer of a feature detector network comprising a set of feature detector neurons having input weights. Each feature detector neuron in the set of feature detector neurons then competes for the feature detector neuron whose input weights best represent the input pattern. Finally, the input weights which compressively code frequently seen input patterns are updated according to a set of learning rules. Also presented is a novel set of rules that transform the functional properties of rate-coded models into the spiking domain.

12 Claims, 18 Drawing Sheets

(56) References Cited

OTHER PUBLICATIONS

Khosla et al, "Bio-Inspired Visual Attention and Object Recognition", Intelligent Computing: Theory and Applications V, Proc. of SPIE vol. 6560, 656003, (2007).*
Izhikevich, "Polychronization: Computation with Spikes", Neural Computation 18, 245-282, (2006).*
Ellias et al, "Pattern Formation, Contrast Control, and Oscillations in the Short Term Memory of Shunting On-Center Off-Surround Networks", Department of Mathematics, Massachusetts Institute of Technology, Cambridge, Massachusetts, USA, Biol. Cybernetics 20, 69-98 (1975), Springer-Verlag 1975.*
Bi, G. & Poo, M. (2001). Synaptic modification of correlated activity: Hebb's postulate revisited. Annual Review Neuroscience, 24, 139-166.
Blum, K. I. & Abbott, L. F. (1996), A model of spatial map formation in the hippocampus of the rat. Neural Computation 8, 85-93.
Bower, J. & Beeman, D. (1998), The book of genesis. New York: Springer-Verlag. (Chapter 6).
Carpenter, G.A. (1997). Distributed learning, recognition, and prediction by ART and ARTMAP neural networks. Neural Networks, 10, 1473-1494.
Carpenter, G.A. (2001). Neural network models of learning and memory: leading questions and an emerging framework. Trends in Cognitive Sciences, 5, 114-116.
Carpenter, G.A., & Grossberg, S. (1981). A massively parallel architecture for a self-organizing neural pattern recognition machine, Computer Vision, Graphics, and Image Processing, 37, 54-115.
Gorchetchnikov, A. & Grossberg, S. (2007), Space, time, and learning in the hippocampus: How fine spatial and temporal scales are expanded into population codes for behavioral control. Neural Networks, 20, 182-93.
Gorchetchnikov, A., Versace, M., & Hasselmo, M. (2005). A mode of STDP based on spatially and temporally local information: Derivation and combination with gated decay. Neural Networks, 18, 458-466.
Gerstner, W. & Abbott, L. F. (1997), Learning navigational maps through potentiation and modulation of hippocampal place cells. Journal of Computational Neuroscience, 4, 79-94.
Gerstner, W., Ritz, R. & van Hemmen, J. (1993). Why spikes? Hebbian learning and retrieval of time-resolved excitation patterns, Biological Cybernetics 69, 503-515.
Gerstner, W., Kempter, R., van Hemmen, J.L. & Wagner, H. (1998), Hebbian learning of pulse timing in the barn owl auditory system. In. W. Maass and C.M. Bishop (Eds.), Pulsed Neural Networks (pp. 353-377), Cambridge: MIT press.
Grossberg, S. (1974), Classical and instrumental conditioning by neural networks. Progress in Theoretical Biology, 3, 51-141.
Grossberg, S. (1973) Contour enhancement, short-term memory, and constancies in reverberating neural networks. Studies in Applied Mathematics, 52, 213-257.
Gupta, A. & Long, L. (2009). Hebbian learning with winner take all for spiking neural networks. In Proceedings of the International Joint Conference on Neural Networks, Atlanta, Jun. 14-19.
Haas J.S., Nowotny T., & Abarbanel HD, (2006), Spike-timing-dependent plasticity of inhibitory synapses in the entorhinal cortex. Journal of Neurophysiol, 96, 3305-3313.
Holmgren C.D., Zilberter Y. (2001), Coincident spiking activity induces long-term changes in inhibition of neocortical pyramidal cells. Journal of Neuroscience, 21, 8270-8277.
Izhikevich E.M. (2004) Which model to use for cortical spiking neurons? IEEE Transactions on Neural Networks, 15, 1063-1070.
Kandel, E. R. (2000), Cellular mechanisms of learning and the biological basis of individuality, In E. R. Kandel, J. H. Schwartz, T. M. Jessell (Eds.), Principles of Neural Science (pp. 1247-1279). New York: McGraw-Hill.
Lagus, K, Honkela, T., Kaski, S., & Kohonen, T. (1996). Self-organizing maps of document collections: A new approach to interactive exploration. In E. Simoudis, J. Han, and U. Fayyad (Eds.), Proceedings of the Second International Conference on Knowledge Discovery and Data Mining (pp. 238-243), Menlo Park: AAAI Press.
Lee, K., & Kwon, D. (2009), Rate coding of spike-timing dependent plasticity: Activity-variation-timing dependent plasticity (AVTDP). Neurocomputing, 72, 1361-1368.
Maass, W. (2000). On the computational power of winner-take-all. Neural Computation, 12. 2519-2535.
Mehta, M. R., Quirk, M. C. & Wilson, M. (2000). Experience dependent asymmetric shape of hippocampal receptive fields. Neuron, 25, 707-715.
Mongillo, G., Barak, O. & Tsodyks, M. (2008). Synaptic theory of working memory, Science, 319,1543-1546.
O'Reilly, R. C., & Munakata, Y. (2000). Computational explorations in cognitive neuroscience: Understanding the mind by simulating the brain. Cambridge: MIT Press. (Chapter 4).
Olson, S. & Grossberg, S. (1998). A neural network model for the development of simple and complex cell receptive fields within cortical maps orientation and ocular dominance. Neural Networks, 11, 189-208.
Oster, M., Douglas, R. & Liu, S.-C. (2009). Computation with spikes in a winner-take-all network, Neural Computation, 21, 2437-65.
Sjöström, P., Rancz, E., Roth, A., & Häusser, M. (2008). Dendritic excitability and synaptic plasticity. Physiological Reviews, 88, 769-840.
Song. S., & Abbott, L. (2001). Cortical development and remapping through spike timing-dependent plasticity. Neuron, 32, 339-350.
Song, S., Miller, K., & Abbott, L. (2000). Competitive Hebbian learning through spike-timing-dependent synaptic plasticity. Nature Neuroscience, 3, 919-926.
Grossberg, S. & Versace, M. (2008), Spikes, synchrony, and attentive learning by laminar thalamocortical circuits. Brain Research, 1218, 278-312.
Vogels, T. & Abbott, L. (2005). Signal propagation and logic gating in networks of integrate-and-fire Neurons. Journal of Neuroscience, 25, 10786-10795.
von der Malsburg, C. (1973). Self-organization of orientation sensitive cells in the striate cortex. Kybernetik, 14, 85-100.
Woodin, M.A., Ganguly, K., Poo M.M. (2003). Coincident pre- and postsynaptic activity modifies GABAergic synapses by postsynaptic changes in Cl-transporter activity. Neuron, 39, 807-20.
Grossberg, S. (1968). Some physiological and biochemical consequences of psychological postulates. Proceedings of the National Academy of Science, 60, 758-765.

* cited by examiner

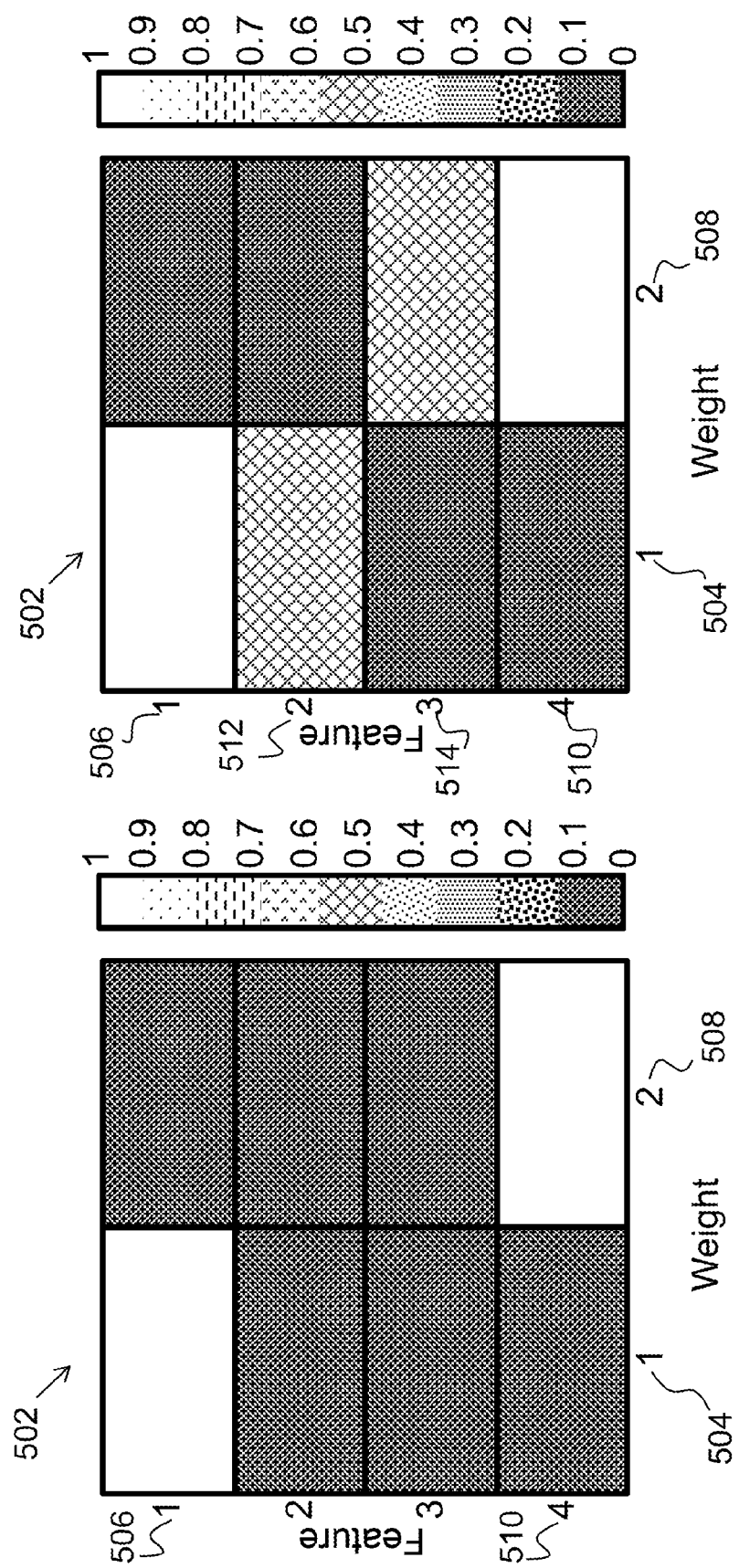

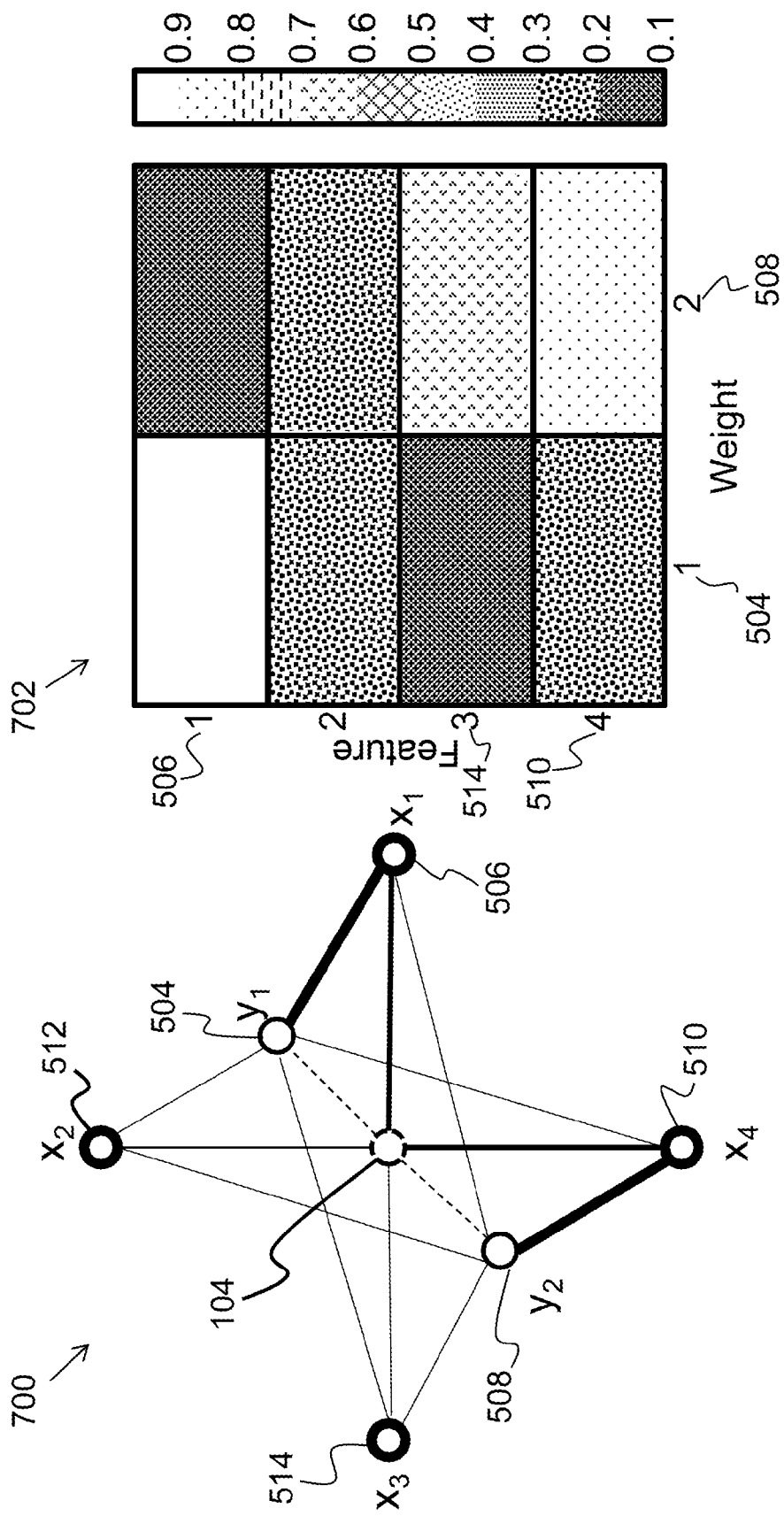

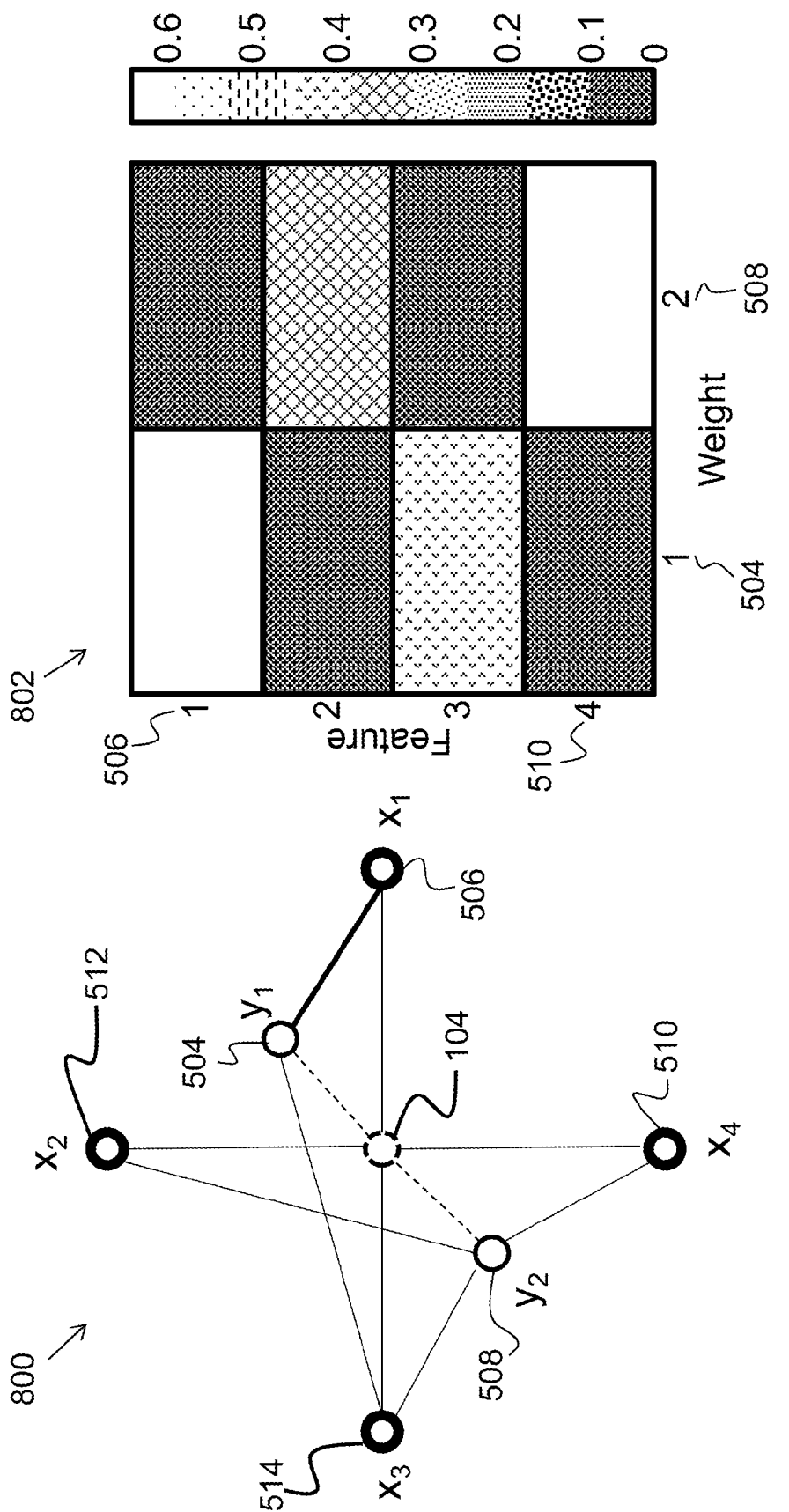

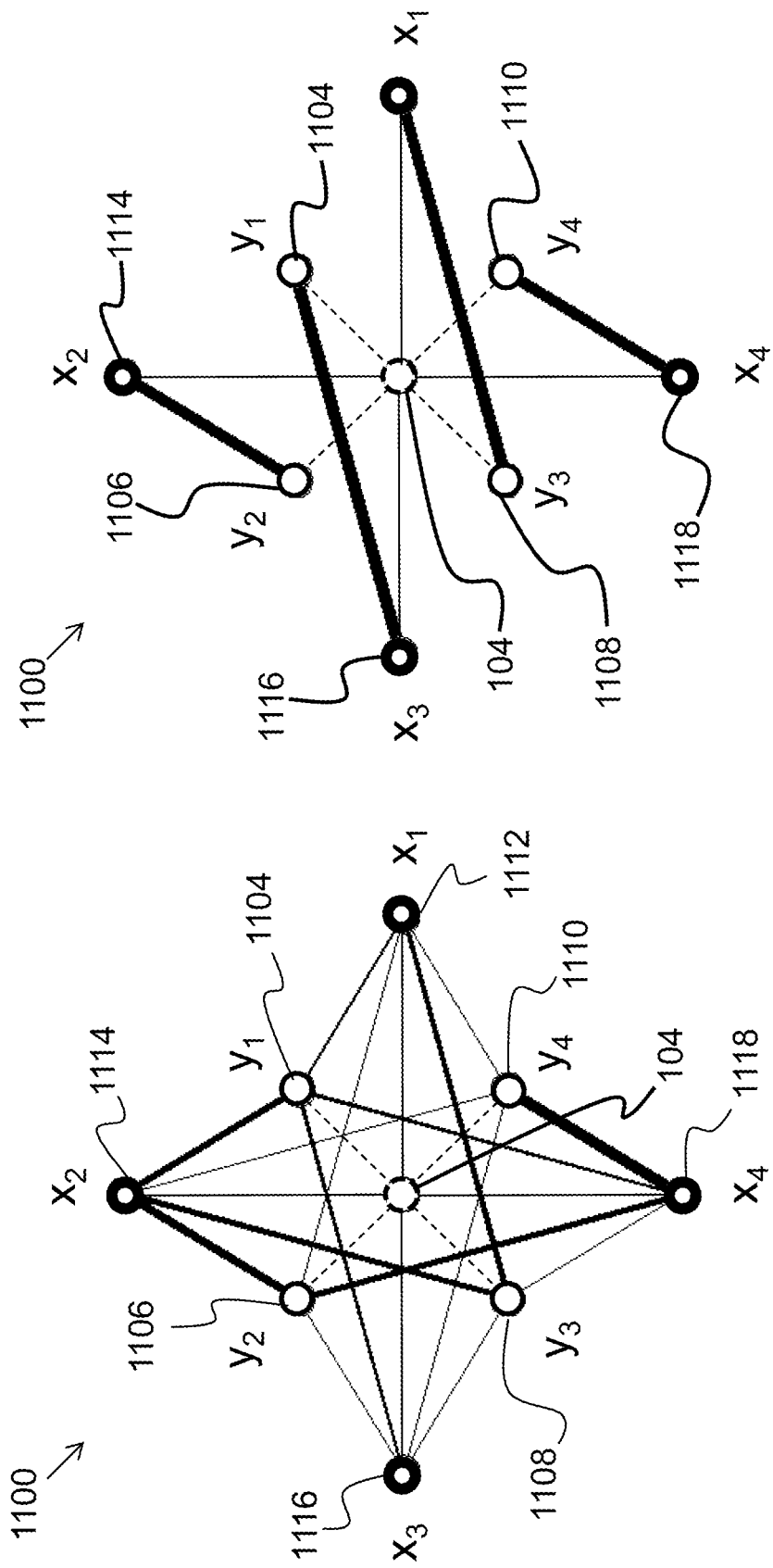

BIO-INSPIRED METHOD AND APPARATUS FOR FEATURE DETECTION WITH SPIKING DYNAMICS

CROSS-REFERENCE TO RELATED APPLICATIONS

The present application is a Non-Provisional patent application of U.S. Provisional Application No. 61/589,766 filed in the United States on Jan. 23, 2012, titled, "Bio-Inspired Method and Apparatus for Feature Detection with Spiking Dynamics."

GOVERNMENT LICENSE RIGHTS

This invention was made with government support under U.S. Government Contract Number BFB8223 under the SyNAPSE contract. The government has certain rights in the invention.

BACKGROUND OF THE INVENTION (1) Field of Invention

The present invention relates to a bio-inspired system for feature detection and, more particularly, to a bio-inspired system for feature detection with spiking dynamics.

(2) Description of Related Art

Learning feature detectors represents one of the most fundamental tasks for neural networks. For current purposes, it refers to the ability to compressively code frequently occurring input patterns. There are many approaches to learning feature detectors. For instance, Instar learning was one of the first neural network models of learning feature detectors. Further, spike-timing-dependent-plasticity (STDP) has gained recent popularity due to its prevalence throughout the brain. "Spike" is a term used to describe input action potentials in a neural network. Instar STDP learning is an attempt to unify both learning rules.

Instar learning is Hebbian learning with post-synaptic gating (see Literature Reference No. 12). Instar learning has the properties of online learning with analog sensitivity to input patterns. As originally defined in Instar learning, rate-coded neurons trace pre-synaptic activities, typically defined by mean firing rates or membrane potentials. Instar learning in the spiking domain has not been previously demonstrated.

STDP is a temporally asymmetric Hebbian learning rule. When pre-synaptic firing precedes post-synaptic firing, peak synaptic conductances or weights are said to increase. On the other hand, when pre-synaptic firing follows post-synaptic firing, peak synaptic conductances or weights are said to decrease. STDP causes an intrinsic normalization of pre-synaptic weights and post-synaptic firing rates, but often leads to bimodal weight distributions (see Literature Reference No. 29). Gorchetchnikov et al. created Instar STDP learning where weights track STDP efficacy values (see Literature Reference No. 8). Although spatially and temporally local, complicated neuronal and synaptic dynamics prevent ready hardware realization.

Although learning feature detectors has been shown in both rate- and spike-coding domains, a continuing need exists for translating the functional properties of rate-coded models into the spiking domain, thereby opening the door for automated conversion across domains.

SUMMARY OF THE INVENTION

The present invention relates to a bio-inspired system for feature detection with spiking dynamics. The system comprises one or more processors and a memory having instructions such that when the instructions are executed, the one or more processors perform several operations. First, an input pattern comprising a plurality of features is received. The input pattern is translated into a spike-coded representation of the input pattern. The spike-coded representation of the input pattern is transmitted to a feature detector layer of a feature detector network comprising a set of feature detector neurons having input weights. The set of feature detector neurons are activated in the feature detector layer. The set of feature detectors in the feature detector layer also compete for the feature detector neuron whose input weights best represent the input pattern. Finally, the input weights which compressively code frequently seen input patterns are updated.

In another aspect, the input weights are updated according to a learning rule selected from the group consisting of Instar learning, spike-timing-dependent plasticity (STDP) learning, and Instar STDP learning.

In another aspect, within the feature detector layer, feature detector neurons with membrane voltages $y_j$, where j denotes the position in the feature detector layer, combine excitatory $E_j$ and inhibitory inputs $I_j$, within an on-center (excitatory) off-surround (inhibitory) shunting equation with reset for spiking dynamics according to the following:

$$\varepsilon_y \left(\frac{dy_j}{dt}\right) = -A(y_j - B) + (C - y_j)E_j - (y_j + D)I_j,$$

$$y_j = \alpha, \text{ when } y_j \geq \beta$$

where A, B, C, D, $\alpha$, $\beta$, and $\epsilon_y$ are parameters, wherein within the feature detector layer a feature detector neuron's excitatory input $E_j$ comprises feed-forward (f), feed-back (b), and tonic (t) terms, which are scaled by constants according to the following:

$$E_j = E_j^f + E_j^b + E^t,$$

$$E_j^f = \kappa_f \sum_{i=1}^{N} w_{ij}(h_i g_{ij}), \text{ and}$$

$$E_j^b = \kappa_b(h_j g_{jj}),$$

where constants $\kappa$ adjust the relative influence of each excitatory term, N is a number of number of input neurons, $E_j^f$ represents a bottom-up excitation from an input layer to the feature detector network to the feature detector layer, $w_{ij}$ and $h_i g_i$ represent synaptic weight and efficacy terms, respectively, between pre-synaptic feature detector neurons in an input layer of the feature detector network and post-synaptic feature detector neurons in the feature detector layer, wherein self-excitation is denoted by $E_j^b$, and wherein $E^t$ represents a tonic drive in the feature detector layer that is independent of position in the feature detector layer.

In another aspect, a feature detector neuron's inhibitory input comprises feed-forward (f) and feedback (b) terms, which are scaled by constants according to the following:

$$I_j = I^f + I_j^b$$

$$I^f = \lambda_f \sum_{i=1}^{N} (h_j g_{ij})$$

$$I_j^b = \lambda_b \sum_{\substack{j'=1 \\ j' \neq j}}^{M} (h_j g_{j'j})$$

where constants $\lambda$ adjust the relative influence of each inhibitory term, $I^f$ is a bottom-up inhibition from the input layer to the feature detector layer, N is a number of input neurons, M is a number of feature detector neurons and wherein competition between feature detector neurons, $I_j^b$, is modeled with recurrent synapses.

In another aspect, Instar learning with spiking dynamics is adapted according to the following:

$$\epsilon_w \left( \frac{dw_{ij}}{dt} \right) = R(g_{ij} - w_{ij})\delta(t - t_{j,spike}),$$

where $\epsilon_w$ is an integration rate, R represents a scalar learning rate and $\delta(t-t_{j,spike})$ represents a delta function at time $t-t_{j,spike}$ acting as a gate where $t_{j,spike}$ is the time of post-synaptic spiking.

As can be appreciated by one skilled in the art, the present invention also comprises a method for causing a processor to perform the operations described herein.

Finally, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5C is a matrix representation of peak synaptic conductances for maintaining pre-tuned weights, before training, according to the present invention;

FIG. 5D is a matrix representation of peak synaptic conductances for maintaining pre-tuned weights, after training, according to the present invention;

FIG. 7A is a network representation of peak synaptic conductances for maintaining pre-tuned results for Instar learning according to the present invention;

FIG. 7B is a matrix representation of peak synaptic conductances for maintaining pre-tuned results for Instar learning according to the present invention;

FIG. 8A is a network representation of peak synaptic conductances for maintaining pre-tuned results for STDP learning according to the present invention;

FIG. 8B is a matrix representation of peak synaptic conductances for maintaining pre-tuned results for STDP learning according to the present invention;

FIG. 11A is a network representation of peak synaptic conductances for creating differential tuning, before training, according to the present invention;

FIG. 11B is a network representation of peak synaptic conductances for creating differential tuning, after training, according to the present invention;

DETAILED DESCRIPTION

Figure 1B:
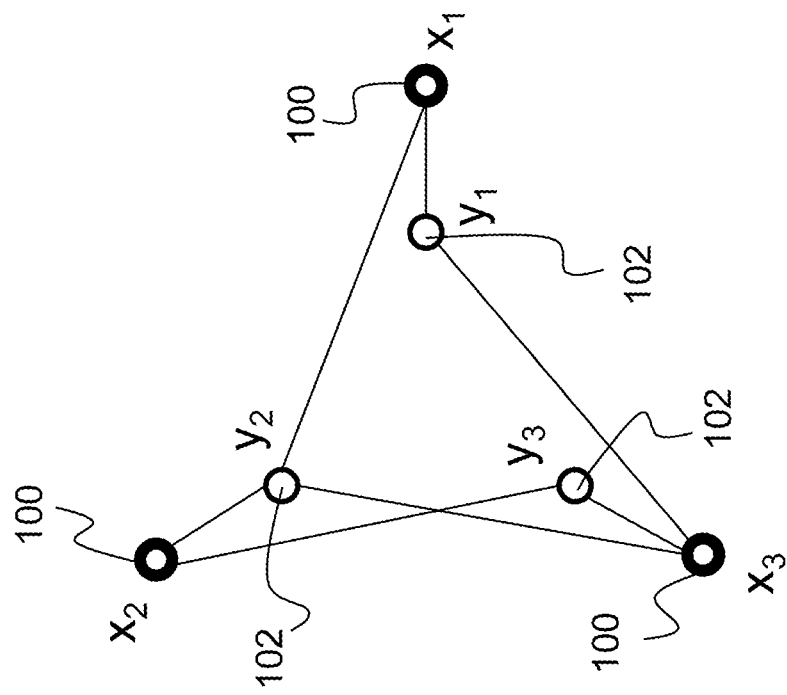
FIG. 1B is a diagram of a feature detector network with sparse connections according to the present invention.

The present invention relates to a bio-inspired system for feature detection and, more particularly, to a bio-inspired system for feature detection with spiking dynamics. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Subsequently, a description of various principal aspects of the present invention is provided. Finally, specific details of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number.

1. Bi, G. & Poo, M. (2001). Synaptic modification of correlated activity: Hebb's postulate revisited. *Annual Review Neuroscience*, 24, 139-166.
2. Blum, K. I. & Abbott, L. F. (1996). A model of spatial map formation in the hippocampus of the rat. *Neural Computation* 8, 85-93.
3. Bower, J. & Beeman, D. (1998). *The book of genesis*. New York: Springer-Verlag. (Chapter 6)
4. Carpenter, G. A. (1997). Distributed learning, recognition, and prediction by ART and ARTMAP neural networks. *Neural Networks*, 10, 1473-1494.
5. Carpenter, G. A. (2001). Neural network models of learning and memory: leading questions and an emerging framework. *Trends in Cognitive Sciences*, 5, 114-118.
6. Carpenter, G. A., & Grossberg, S. (1987). A massively parallel architecture for a self-organizing neural pattern recognition machine. *Computer Vision, Graphics, and Image Processing*, 37, 54-115.
7. Gorchetchnikov, A. & Grossberg, S. (2007). Space, time, and learning in the hippocampus: How fine spatial and temporal scales are expanded into population codes for behavioral control. *Neural Networks*, 20, 182-93.
8. Gorchetchnikov, A., Versace, M., & Hasselmo, M. (2005). A model of STDP based on spatially and temporally local information: Derivation and combination with gated decay. *Neural Networks*, 18, 458-466.
9. Gerstner, W. & Abbott, L. F. (1997). Learning navigational maps through potentiation and modulation of hippocampal place cells. *Journal of Computational Neuroscience*, 4, 79-94.
10. Gerstner, W., Ritz, R. & van Hemmen, J. (1993). Why spikes?Hebbian learning and retrieval of time-resolved excitation patterns. *Biological Cybernetics* 69, 503-515.
11. Gerstner, W., Kempter, R., van Hemmen, J. L. & Wagner, H. (1998). Hebbian learning of pulse timing in the barn owl auditory system. In: W. Maass and C. M. Bishop (Eds.), *Pulsed Neural Networks* (pp. 353-377), Cambridge: MIT press.
12. Grossberg, S. (1974). Classical and instrumental conditioning by neural networks. *Progress in Theoretical Biology*, 3, 51-141.
13. Grossberg, S. (1973). Contour enhancement, short-term memory, and constancies in reverberating neural networks. *Studies in Applied Mathematics*, 52, 213-257.
14. Gupta, A. & Long, L. (2009). Hebbian learning with winner take all for spiking neural networks. In *Proceedings of the International Joint Conference on Neural Networks*, Atlanta, June 14-19.
15. Haas J. S., Nowotny T., & Abarbanel H D. (2006). Spike-timing-dependent plasticity of inhibitory synapses in the entorhinal cortex. *Journal of Neurophysiol*, 96, 3305-3313.
16. Holmgren C. D., Zilberter Y. (2001). Coincident spiking activity induces long-term changes in inhibition of neocortical pyramidal cells. *Journal of Neuroscience*, 21, 8270-8277.
17. Izhikevich E. M. (2004). Which model to use for cortical spiking neurons?*IEEE Transactions on Neural Networks*, 15, 1063-1070.
18. Kandel, E. R. (2000). Cellular mechanisms of learning and the biological basis of individuality. In E. R. Kandel, J. H. Schwartz, T. M. Jessell (Eds.), *Principles of Neural Science* (pp. 1247-1279). New York: McGraw-Hill.
19. Lagus, K, Honkela, T., Kaski, S., & Kohonen, T. (1996). Self-organizing maps of document collections: A new approach to interactive exploration. In E. Simoudis, J. Han, and U. Fayyad (Eds.), *Proceedings of the Second International Conference on Knowledge Discovery and Data Mining* (pp. 238-243). Menlo Park: AAAI Press.
20. Lee, K., & Kwon, D. (2009). Rate coding of spike-timing dependent plasticity: Activity-variation-timing dependent plasticity (AVTDP). *Neurocomputing*, 72, 1361-1368.
21. Maass, W. (2000). On the computational power of winner-take-all. *Neural Computation*, 12, 2519-2535.
22. Mehta, M. R., Quirk, M. C. & Wilson, M. (2000). Experience dependent asymmetric shape of hippocampal receptive fields. *Neuron*, 25, 707-715.

23. Mongillo, G., Barak, O. & Tsodyks, M. (2008). Synaptic theory of working memory. *Science,* 319, 1543-1546.
24. O'Reilly, R. C., & Munakata, Y. (2000). Computational explorations in cognitive neuroscience: Understanding the mind by simulating the brain. Cambridge: MIT Press. (Chapter 4)
25. Olson, S. & Grossberg, S. (1998). A neural network model for the development of simple and complex cell receptive fields within cortical maps of orientation and ocular dominance. *Neural Networks,* 11, 189-208.
26. Oster, M., Douglas, R. & Liu, S.-C. (2009). Computation with spikes in a winner-take-all network, *Neural Computation,* 21, 2437-65.
27. Sjöström, P., Rancz, E., Roth, A., & Häusser, M. (2008). Dendritic excitability and synaptic plasticity. *Physiological Reviews,* 88, 769-840.
28. Song, S., & Abbott, L. (2001). Cortical development and remapping through spike timing-dependent plasticity. *Neuron,* 32, 339-350.
29. Song, S., Miller, K., & Abbott, L. (2000). Competitive Hebbian learning through spike-timing-dependent synaptic plasticity. *Nature Neuroscience,* 3, 919-926.
30. Grossberg, S. & Versace, M. (2008). Spikes, synchrony, and attentive learning by laminar thalamocortical circuits. *Brain Research,* 1218, 278-312.
31. Vogels, T. & Abbott, L. (2005). Signal propagation and logic gating in networks of integrate-and-fire Neurons. *Journal of Neuroscience,* 25, 10786-10795.
32. von der Malsburg, C. (1973). Self-organization of orientation sensitive cells in the striate cortex. *Kybernetik,* 14, 85-100.
33. Woodin, M. A., Ganguly, K., Poo M. M. (2003). Coincident pre- and postsynaptic activity modifies GABAergic synapses by postsynaptic changes in Cl-transporter activity. *Neuron,* 39, 807-20.
34. Grossberg, S. (1968). Some physiological and biochemical consequences of psychological postulates. *Proceedings of the National Academy of Sciences,* 60, 758-765.

(2) Principal Aspects

The present invention has three "principal" aspects. The first is a system for feature detection with spiking dynamics. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for feature detection with spiking dynamics. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Specific Details (3.1) Introduction

The present invention describes a bio-inspired method and apparatus for feature detection with spiking dynamics. The invention can be used to recognize frequently seen input patterns within any algorithm or as part of a larger systems-level application. Also presented in this invention is a novel set of rules that transform the functional properties of rate-coded models into the spiking domain.

Learning feature detectors represents one of the most fundamental tasks for neural networks. For current purposes, it refers to the ability to compressively code frequently occurring input patterns. Topology and distributed coding among feature detectors are often sought, but not strictly necessary by this definition (see Literature Reference No. 5). Early examples include learning visual orientation detectors (see Literature Reference No. 32) and organizing documents (see Literature Reference No. 19).

Many neural network models use rate-coding. Although these models have shown many useful functions for perception, action and cognition, they are incompatible with some hardware requirements. In particular, high density, low power spike-coded integrated circuits are sought. Rate-coding is often explained as integrating spikes over time or space, but presented herein is a set of rules that transform the functional properties of rate-coded models into the spiking domain. Neuronal, synaptic, competitive, and learning dynamics are systematically translated from the rate- to spike-coded domain for fan-in Instar networks. Learning feature detectors is then demonstrated with Instar, STDP, and Instar STDP learning laws. As will be reviewed below, Instar learning proved to be the most stable and able to create differential tuning in tests.

Feature detector networks are typically composed of two or more layers. Neurons in the first input layer excite neurons in the second feature detector layer, or map layer. With appropriate learning and sufficient competition in the second layer, neurons become tuned for differing input patterns. Often, the first and second layers represent the thalamus and the neocortex of the brain, respectively.

Figure 1A:
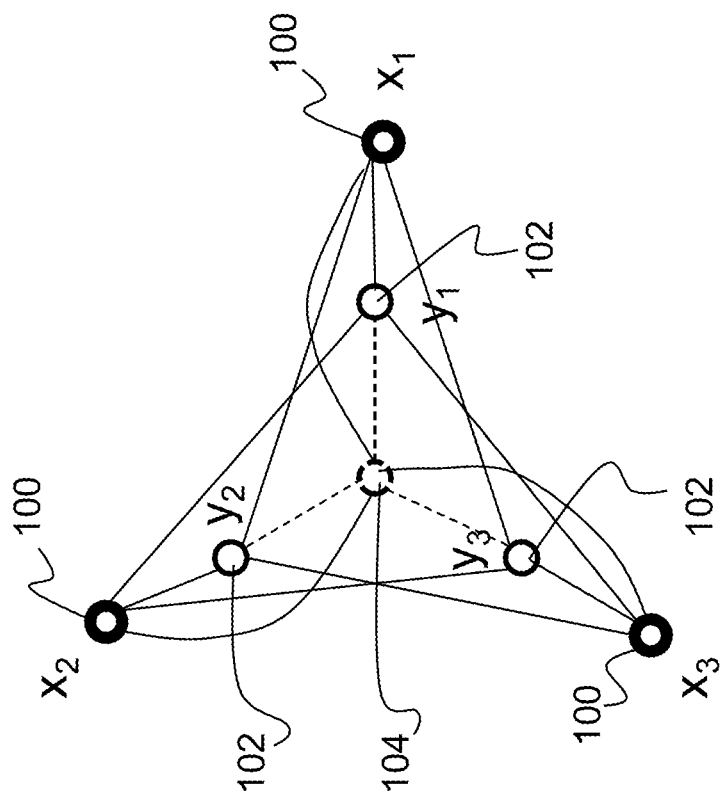
FIG. 1A is a diagram of a feature detector network with full connections according to the present invention.

FIGS. 1A and 1B illustrate non-limiting examples of feature detector networks with full and sparse connections, respectively. As can be appreciated by one skilled in the art, the invention is not limited by the number of depicted neurons in these or other figures. Feature detector networks typically consist of N input neurons ($x_i$, 100) and M feature detector, or map neurons ($y_j$, 102). In each of the figures presented, the circles illustrated in a heavier weight represent the input neurons, and the circles illustrated in a standard weight represent the feature detector, or map neurons. In FIG. 1A, input neurons 100 are fully connected to map neurons 102, and competition between map neurons 102 occurs through an inhibitory inter-neuron 104, which is also fed by input neurons 100. The inter-neuron 104 can also be fed by map neurons 102. Winner-take-all competition is common in the map layer.

In FIG. 1B, input neurons 100 are sparsely connected to map neurons 102 (N>>M). Map neurons 102 do not compete directly. Sparse connections prevent map neurons 102 from sharing similar inputs, thus forming a form of competition without use of an inhibitory inter-neuron.

Instar learning is Hebbian learning with post-synaptic gating (see Literature Reference No. 12). Instar learning has the properties of online learning with analog sensitivity to input patterns. Example applications range from general unsupervised learning (see Literature Reference No. 6) to learning simple and complex cell receptive fields within cortical maps of orientation and ocular dominance (see Literature Reference No. 25). As originally defined, rate-coded neurons trace pre-synaptic activities, typically defined by mean firing rates or membrane potentials. Distributed learning across post-synaptic neurons was addressed in Literature Reference No. 4. Spike-timing-dependent-plasticity (STDP) is a temporally asymmetric Hebbian learning rule: when pre-synaptic firing precedes post-synaptic firing, peak synaptic conductances or weights are said to increase; when pre-synaptic firing follows post-synaptic firing, peak synaptic conductances or weights are said to decrease (see Literature Reference Nos. 1 and 27). Additionally, STDP causes an intrinsic normalization of pre-synaptic weights and post-synaptic firing rates but often leads to bimodal weight distributions (see Literature Reference No. 29). Example applications range from temporal pattern recognition (see Literature Reference No. 10) to navigation (see Literature Reference Nos. 2, 9, and 22).

Furthermore, Instar STDP learning was created where weights track STDP efficacy values (see Literature Reference No. 8). Example applications include spatial pattern recognition (see Literature Reference No. 30) and navigation (see Literature Reference No. 7). Although spatially and temporally local, complicated neuronal and synaptic dynamics prevent ready hardware realization. Furthermore, Instar learning in the spiking domain without STDP was not considered. The purpose of the present invention is to demonstrate performance of Instar, STDP, and Instar STDP learning on learning feature detector tasks.

(3.2) Computer Simulations and Results

Figure 2A:
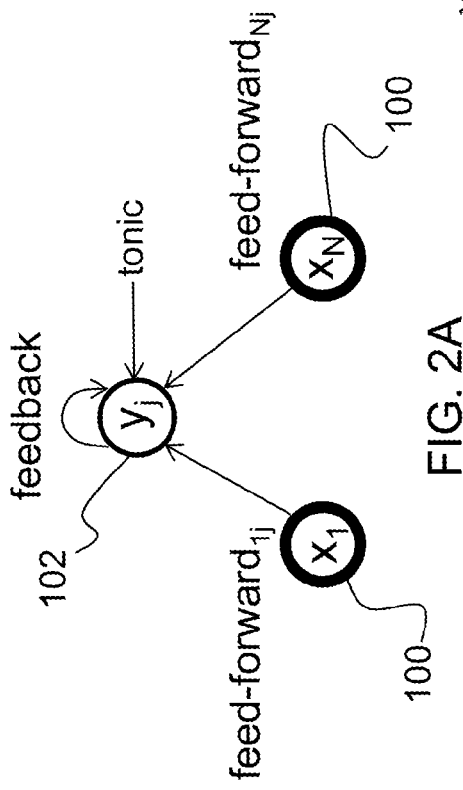
FIG. 2A is a diagram of connections for a testbed network according to the present invention.
Figure 2C:
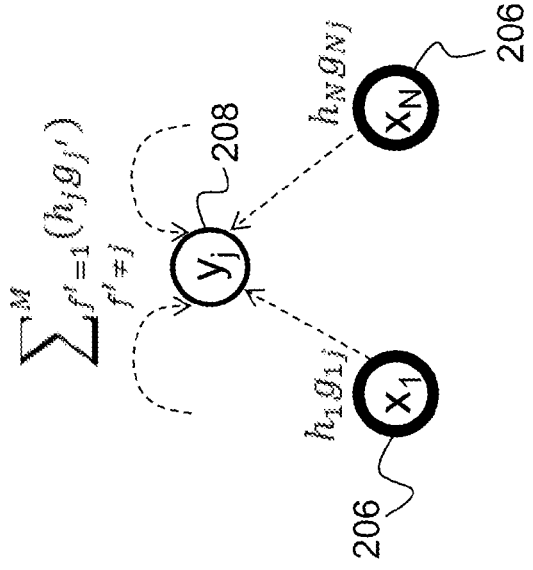
FIG. 2C is a diagram of inhibitory connections for a testbed network according to the present invention.
Figure 2B:
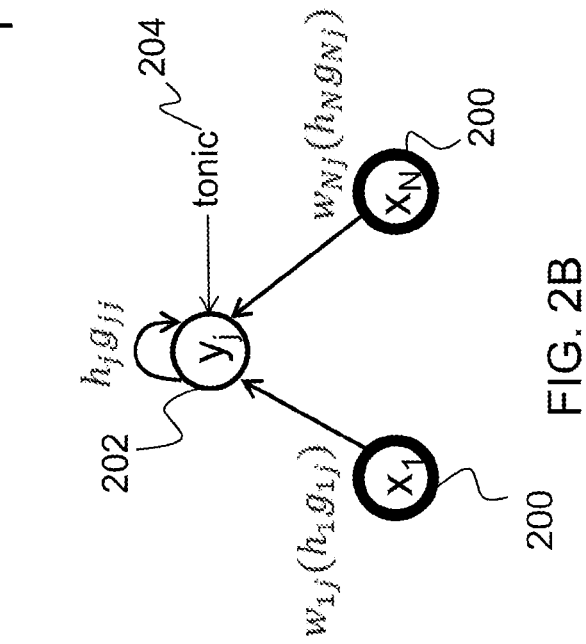
FIG. 2B is a diagram of excitatory connections for a testbed network according to the present invention.

Using the dynamics described in detail below, feature detector learning networks were created, as shown in FIGS. 2A-2C. FIGS. 2A-2C demonstrate how generic connections (FIG. 2A) can be decomposed into excitatory (FIG. 2B) and inhibitory (FIG. 2C) sub-networks. FIG. 2A illustrates a testbed feature network with generic connections. The weights for each feature detector, or map, neuron 102, represent a compressive code of frequently seen input patterns, with each weight element corresponding to an input neuron 100. When input patterns are presented, competition across feature detector (or map) neurons 102 selects the neuron whose weights code the input best. A feature is detected by the pattern of responses in the map layer. For example, if input pattern X activates map neuron Y, that neuron encodes that pattern. Map neurons are activated by their excitatory connections; if a neuron's weights are more similar to an input pattern than other neurons, its activation will be higher than the activations of other neurons. Map neurons also compete through inhibitory connections; if a neuron's weights are not as similar to an input pattern as the weights to other neurons, its activation will be lowered through competition. This is known as an on-center (excitatory) off-surround (inhibitory) network. In FIG. 2B, excitatory connections are from feed-forward input 200 (bottom-up, $w_{ij}h_ig_{ij}$), feedback 202 (top-down, $h_jg_{ij}$), and tonic terms 204 (e.g., a constant such as 2.5). In FIG. 2C, inhibitory connections are from feed-forward input 206 (bottom-up, $h_ig_{ij}$) and feedback 208 (top-down) terms.

Figure 3:
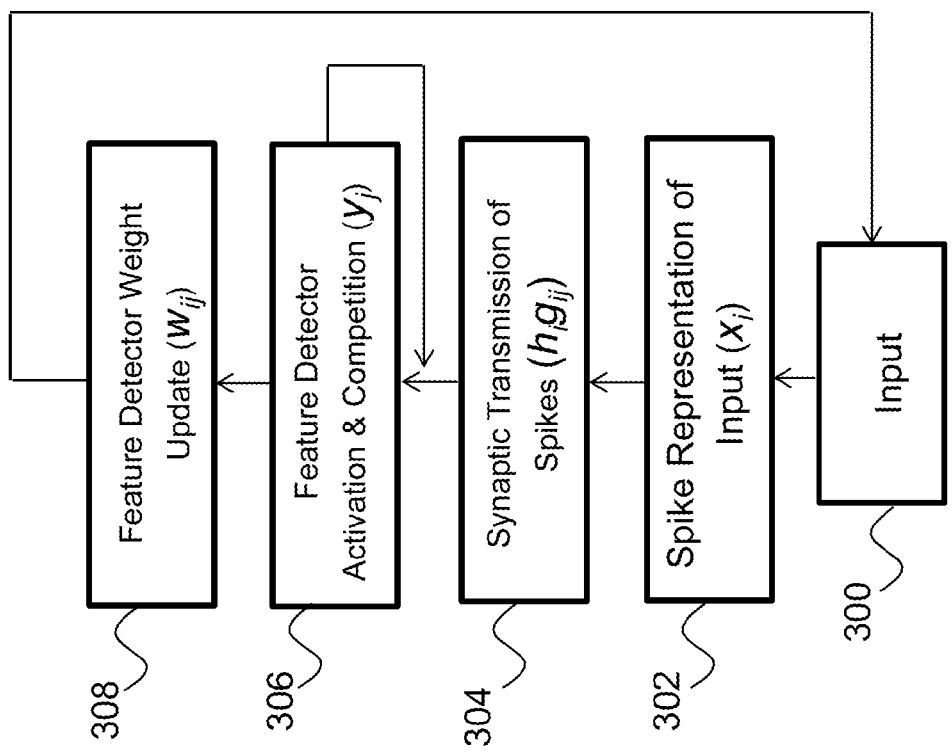
FIG. 3 is a flow diagram depicting information flow for testbed networks according to the present invention.

Alternatively, these networks can be depicted with the information flow diagram presented in FIG. 3. Input 300 patterns are translated into spike representation 302 and synaptically transmitted 304 to the feature detector layer 306. In the feature detector layer 306, neurons are activated by feed-forward, feed-back, and tonic input terms, but also inhibited by feed-forward and feed-back input terms (feature detection and activation and competition 306). In summary, the neurons are activated but compete against each other for the one neuron whose weights best represent the input pattern. After competition across feature detector neuron converges, the input weights which compressively code frequently seen input patterns are then updated 308.

To test which feature detector network learning rules worked best, two desirable qualities were investigated: stability and the ability to create differential tuning (also known as symmetry breaking). Stability refers to the ability of a learning rule to maintain feature detectors in the face of noise and changes in input pattern frequencies. Differential tuning refers to the ability to tune initially random weights to code distinct input patterns. To study this, two testbed networks were constructed, as described below.

(3.2.1) Tests of Stability: Maintaining Pre-Tuned Feature Detectors

Figure 4:
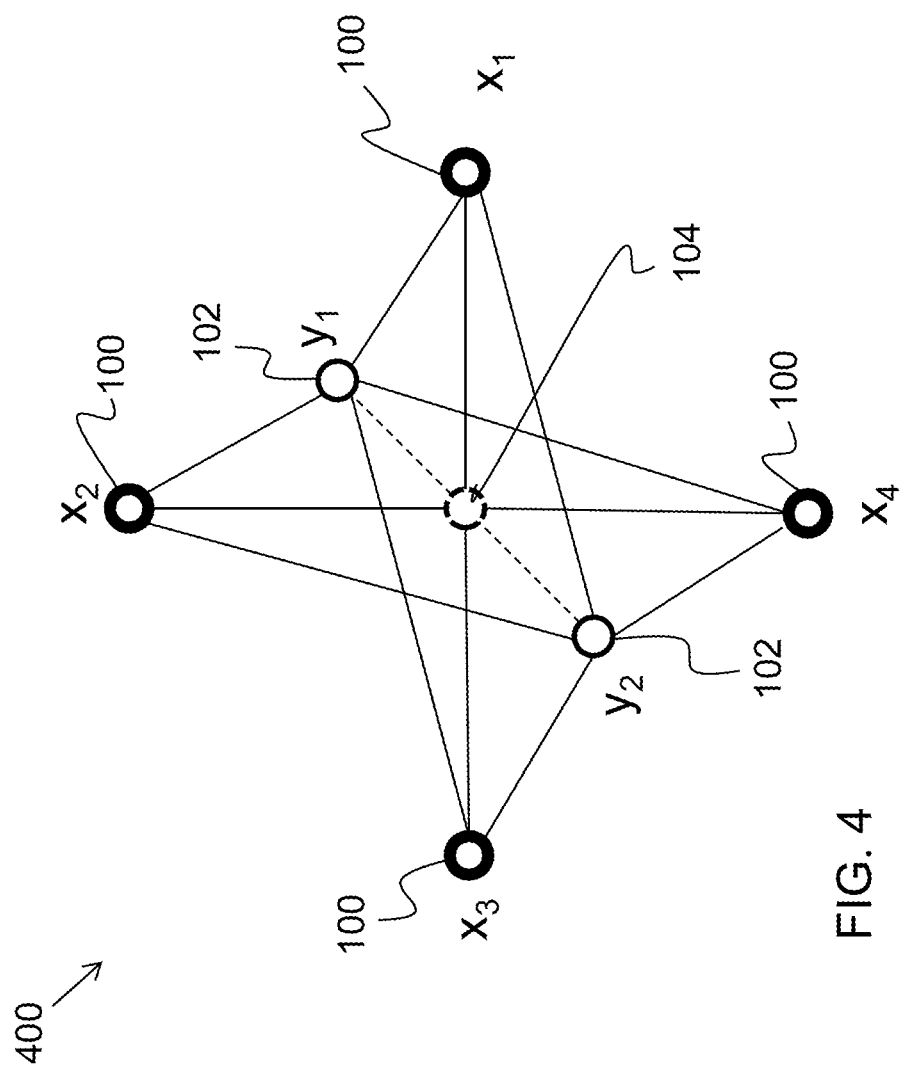
FIG. 4 is diagram depicting a testbed network for testing learning stability according to the present invention.

The purpose was to test the stability of a learning rule as pre-tuned feature detectors are subjected to changes in input pattern frequencies. FIG. 4 illustrates a testbed network 400 for testing learning rule stability. The testbed network 400 is composed of four input neurons (x) 100 which drive two map (feature detector) neurons (y) 102.

Figure 5B:
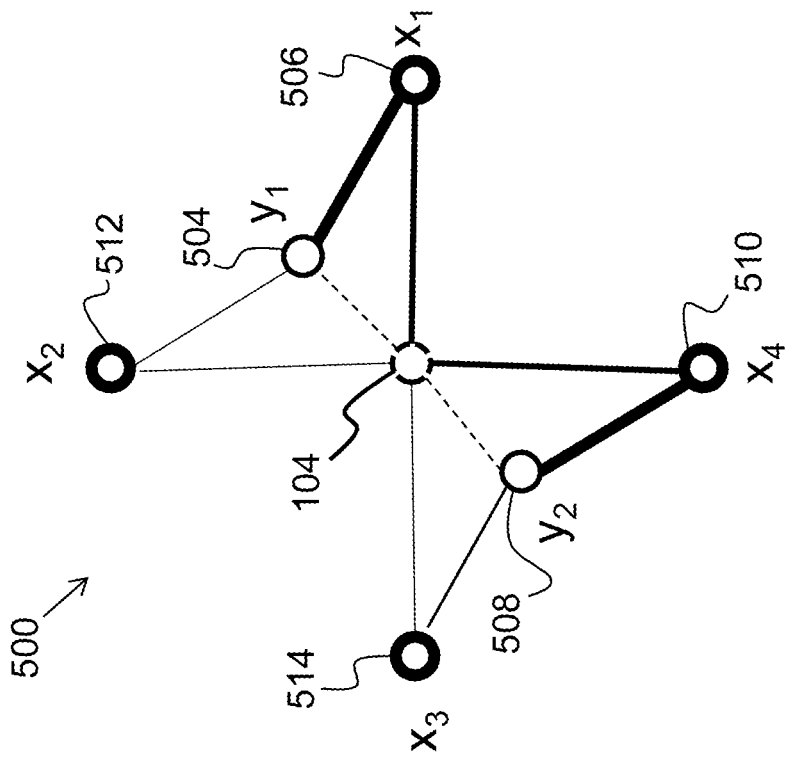
FIG. 5B is a network representation of peak synaptic conductances for maintaining pre-tuned weights, after training, according to the present invention.
Figure 5A:
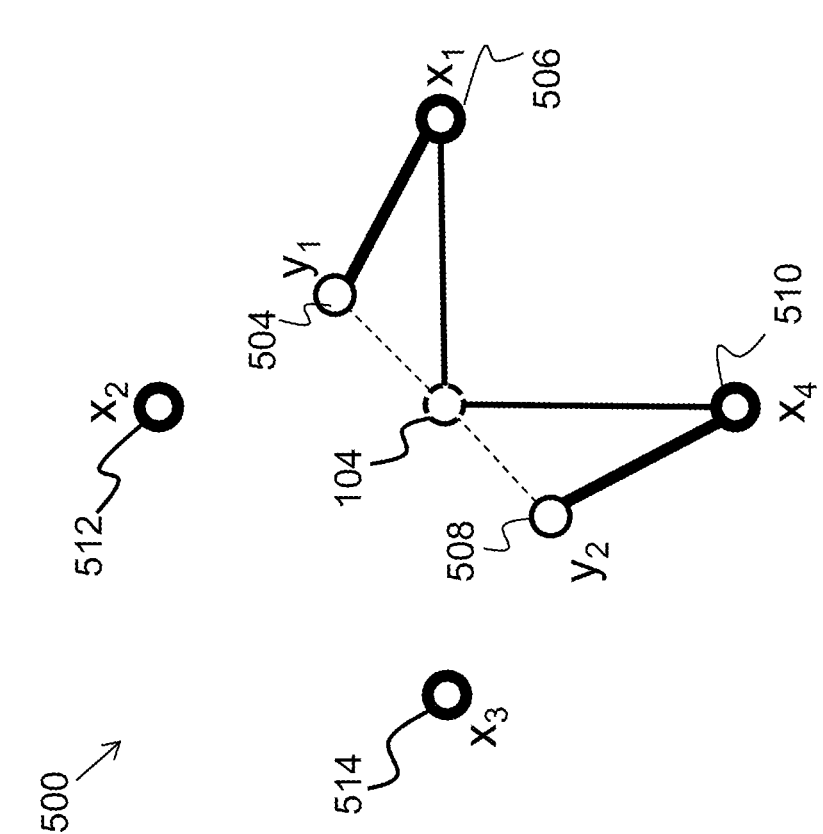
FIG. 5A is a network representation of peak synaptic conductances for maintaining pre-tuned weights, before training, according to the present invention.

FIGS. 5A-5D illustrate network representations 500 (FIGS. 5A and 5B) and matrix representations 502 (FIGS. 5C and 5D) of peak synaptic conductances for maintaining pre-tuned weights. In FIGS. 5C and 5D, the map index runs along the horizontal axis, while input index descends along the vertical axis. The strength of the weight is depicted on the right-hand side of each matrix representation, where a lower number (e.g., 0.1) represents a weak connection between neurons, and a higher number (e.g., 0.9) represents a strong connection between neurons. FIGS. 5A and 5C are representations before training, and FIGS. 5B and 5D are representations after training. Weights were pre-tuned so the first feature detector (map) neuron 504 was tuned to feature 1 (first input neuron) 506, and the second feature detector (map) neuron 508 was tuned to feature 4 (fourth input neuron) 510. In FIGS. 5A and 5B, as well as each of the network representations illustrated in the figures of the present application, the strength of the correlation/connection between neurons is represented by the weight of the line connecting the neurons. Thus, a stronger connection/correlation is depicted as a line having a heavier weight, and a weaker correlation/connection is depicted as a line having a standard weight.

As depicted in FIGS. 5B and 5D (representations after training), if a learning rule was stable, some spread in the first feature detector (map) neuron 504 towards feature 2 512 (as indicated by lighter shading in FIG. 5D) would be expected, because the second input neuron 512 is more temporally correlated with the first input neuron 506. Further, some spread in the second feature detector (map) neuron 508 towards the feature 3 (third input neuron) 514 would be expected, because the third input neuron 514 is more temporally correlated with the fourth input neuron 510. If a learning rule cannot maintain pre-tuned weights, there is a possibility of oscillations or chaos in less structured environments. Stability is measured by how much de-tuning of individual weights occurs, and how much weights remain dissimilar. Details regarding how the measures are computed will be presented below.

In summary, in FIGS. 5A and 5C, the first feature detector (map) neuron 504 is exclusively tuned to feature 1 (first input neuron) 506, while the second feature detector (map)

neuron 508 only responds to feature 4 (fourth input neuron) 510, as represented by a light fill pattern in FIG. 5C and a connecting line in FIG. 5A. Tuning for both neurons is high while their dissimilarity is also high. In FIGS. 5B and 5D, after the presentation of input patterns with lateral spread, the first feature detector (map) neuron 504 is also tuned to feature 2 (second input neuron) 512, and likewise the second feature detector (map) neuron 508 responds to feature 3 (third input neuron) 514. This is indicated by the change in fill pattern between FIGS. 5C and 5D for the aforementioned input and feature detector (map) neuron combinations. Tuning is reduced for both neurons without affecting dissimilarity. This is significant because if feature detectors are more similar (less dissimilar), they would come to encode similar, if not the same, input patterns. Thus, the network could not distinguish input patterns (i.e., all neurons would be equally active).

Figure 6:
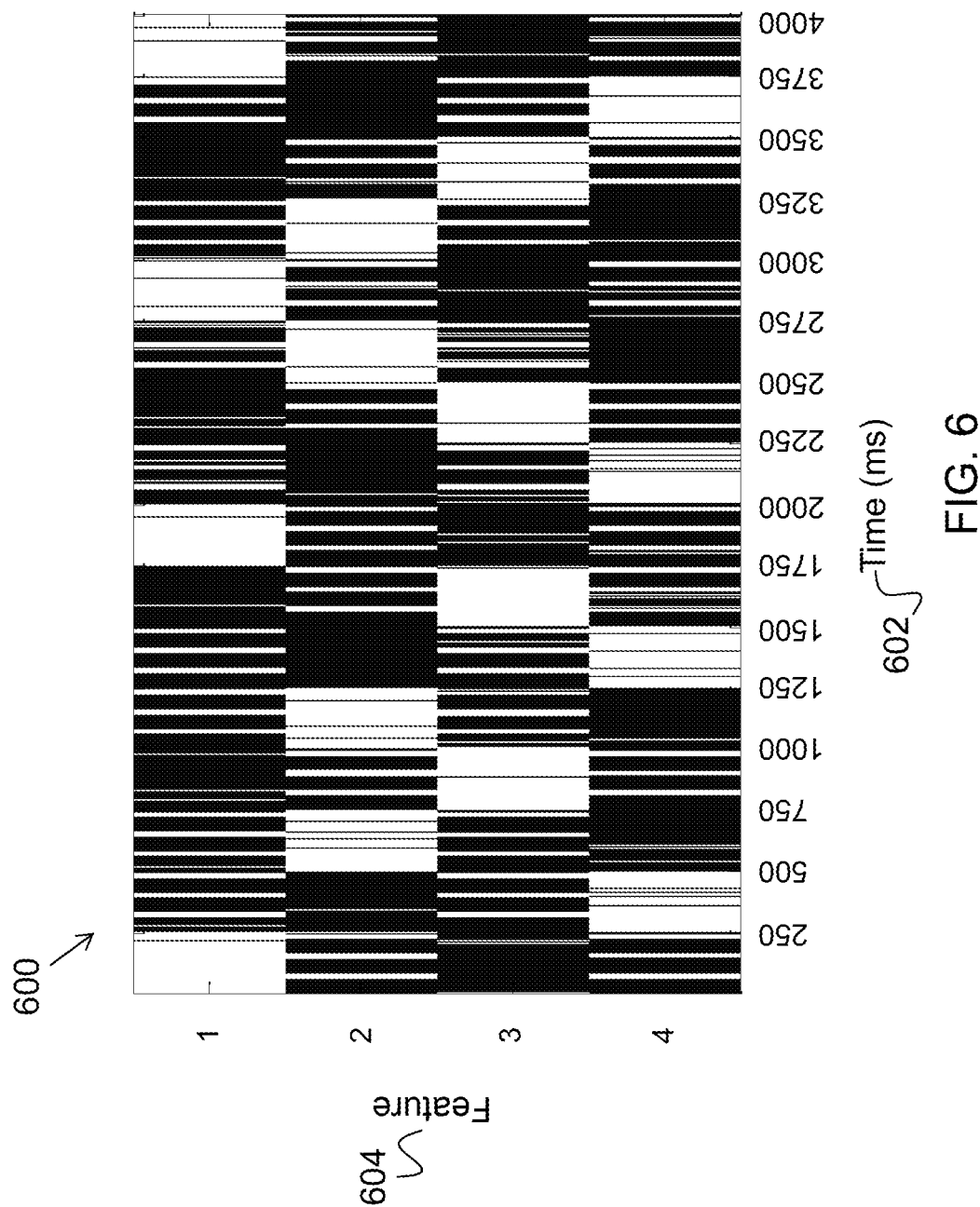
FIG. 6 is a raster plot representation of input networks in the input layer according to the present invention.

FIG. 6 is a raster plot 600 representation of input to the networks in the input layer (x), with four sweeps. Time 602 runs along the horizontal axis, while the input index 604 descends along the vertical axis. White represents spiking, and black represents no spiking. For each time window (e.g., 250 ms in length), an input index (e.g., 1, 2, 3, or 4) is chosen randomly and that neuron, along with its neighbors, spike, although less often than the central neuron. Neurons outside the central window also have a baseline firing rate. The process of selecting input indices continues until all input neurons have been selected, which comprises one sweep. As can be appreciated by one skilled in the art, other input patterns are possible. For example, if one wanted to present images, each pixel (or group thereof) could be assigned to a neuron with its firing rate being proportional to the pixel's intensity, hue, etc. Similarly, if one wanted to present sounds, a Fourier transform could be applied first, then each frequency (or group thereof) could be assigned to a neuron with its firing rate being proportional to the power in that frequency.

(3.2.2) Results for Tests of Stability: Maintaining Pre-Tuned Feature Detectors

With respect to which weights code which features, all learning laws maintain pre-tuned feature detectors. As expected, all weights are de-tuned and more alike due to lateral spread in the input. However, looking at which particular weights change tells a different story. For Instar and Instar STDP learning, spread in initially tuned weights reflects the lateral spread in the input patterns. For STDP, however, the first feature detector neuron takes on a higher weight for feature 3 than feature 2. Additionally, the second feature detector neuron takes on a higher weight for feature 2 than feature 3. This is because traces of pre-synaptic firing cause a winning neuron to learn previously seen input patterns long after they have passed. This causes more tuned and dissimilar weights, but it does not accurately reflect the input patterns.

FIGS. 7A and 7B show a network representation 700 and a matrix representation 702, respectively, of the maintenance of pre-tuned results with Instar learning, where tuning=0.2631 and dissimilarity=0.5933. Feature detector (map) neuron 1 504 remains most sensitive to feature 1 (first input neuron) 506, and feature detector (map) neuron 2 508 remains most sensitive to feature 4 (fourth input neuron) 510, as indicated by the least dense sections of the matrix representation 702 and connecting lines in the network representation 700. Lateral spread in the input has caused the weights to also encode other features leading to decreased tuning and dissimilarity values (represented by differential shading in the matrix representation 702 as compared to the matrix representation 502 in FIG. 5D). Final weights also reflect the lateral spread in the input; for example, feature detector (map) neuron 2's 508 second most preferred input is feature 3 (third input neuron) 514, as indicated by the next lightest shading in the matrix representation 702.

FIGS. 8A and 8B display a network representation 800 and a matrix representation 802, respectively, of the maintenance of pre-tuned results with STDP, where tuning=0.3488 and dissimilarity=0.9842. Feature detector (map) neuron 1 504 remains most sensitive to feature 1 (first input neuron) 506. Feature detector (map) neuron 2 508 remains most sensitive to feature 4 (fourth input neuron) 510. Lateral spread in the input has caused the weights to also encode other features leading to decreased tuning and dissimilarity values.

Figures 9A, 9B:
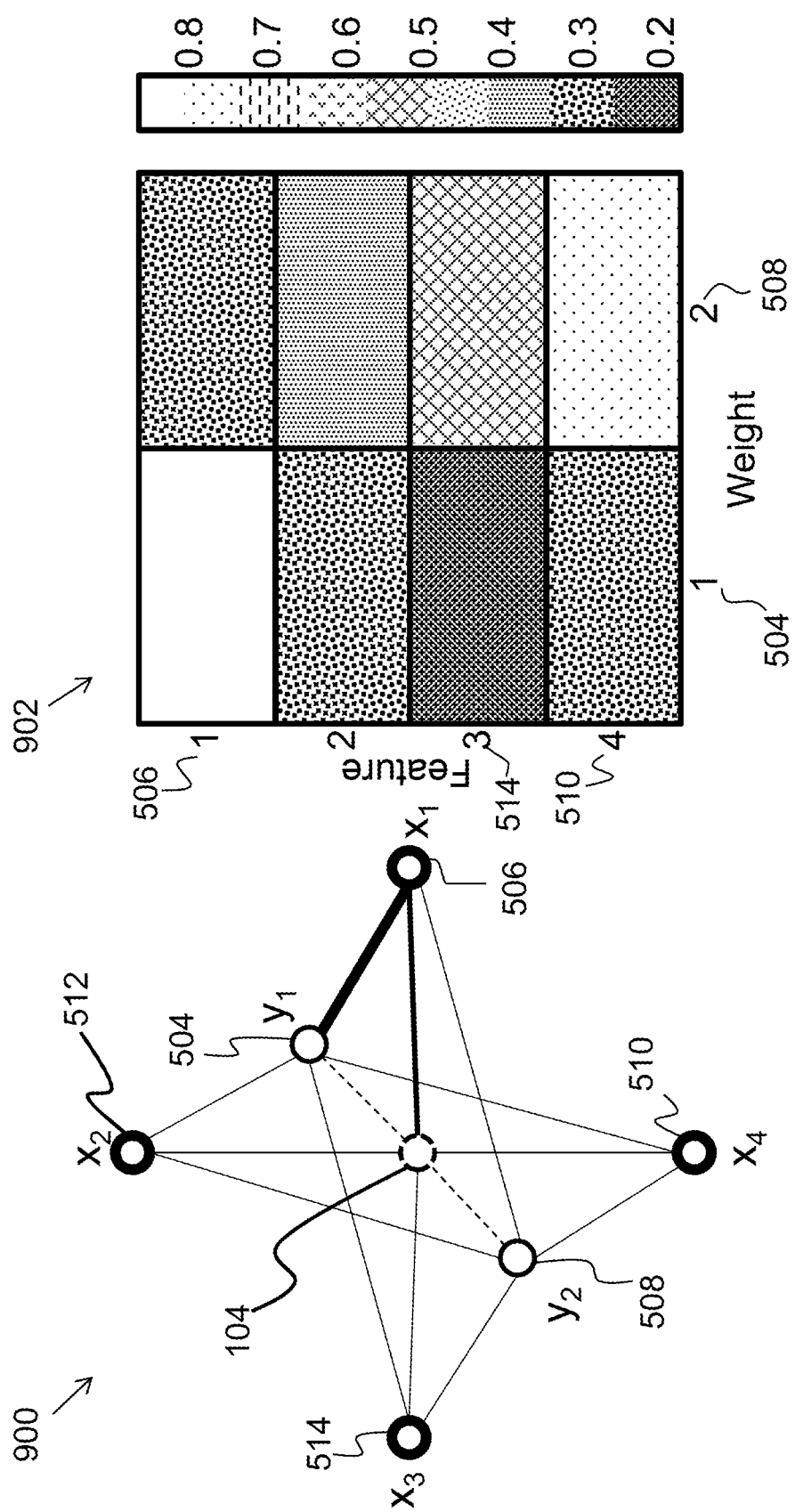
FIG. 9A is a network representation of peak synaptic conductances for maintaining pre-tuned results for Instar STDP learning according to the present invention.
FIG. 9B is a matrix representation of peak synaptic conductances for maintaining pre-tuned results for Instar STDP learning according to the present invention.

FIGS. 9A and 9B illustrate a network representation 900 and a matrix representation 902, respectively, of the maintenance of pre-tuned results with Instar STDP, where tuning=0.2049 and dissimilarity=0.4090. Feature detector (map) neuron 1 504 remains most sensitive to feature 1 (first input neuron) 506. Feature detector (map) neuron 2 508 remains most sensitive to feature 4 (fourth input neuron) 510. Lateral spread in the input has caused the weights to also encode other features leading to decreased tuning and dissimilarity values. Final weights also reflect the lateral spread in the input; for example, feature detector (map) neuron 2's 508 second most preferred input is feature 3 (third input neuron) 514.

(3.2.3) Tests of Differential Tuning: Learning Feature Detectors

Figure 10:
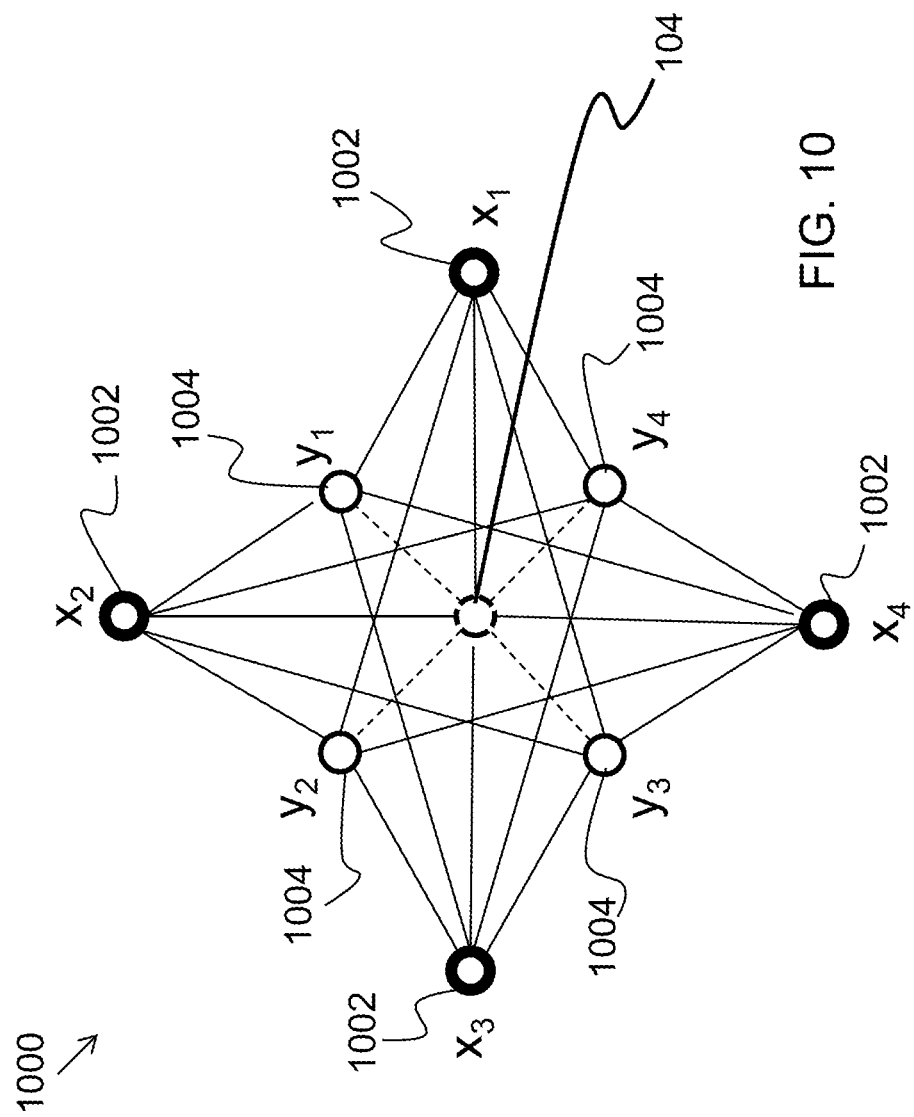
FIG. 10 is a diagram of a testbed network for testing differential tuning according to the present invention.

A test was performed to test the ability of a learning rule to tune neurons to respond to different features. A non-limiting example is depicted in FIG. 10. The testbed network 1000 was composed of four input neurons (x) 1002 which drive four feature detector neurons (y) 1004. Weights were randomly initialized. As before, inputs patterns with lateral spread were presented in four sweeps. Neuron, synapse, and competitive dynamics were held constant, but the learning law was varied.

Figure 11D:
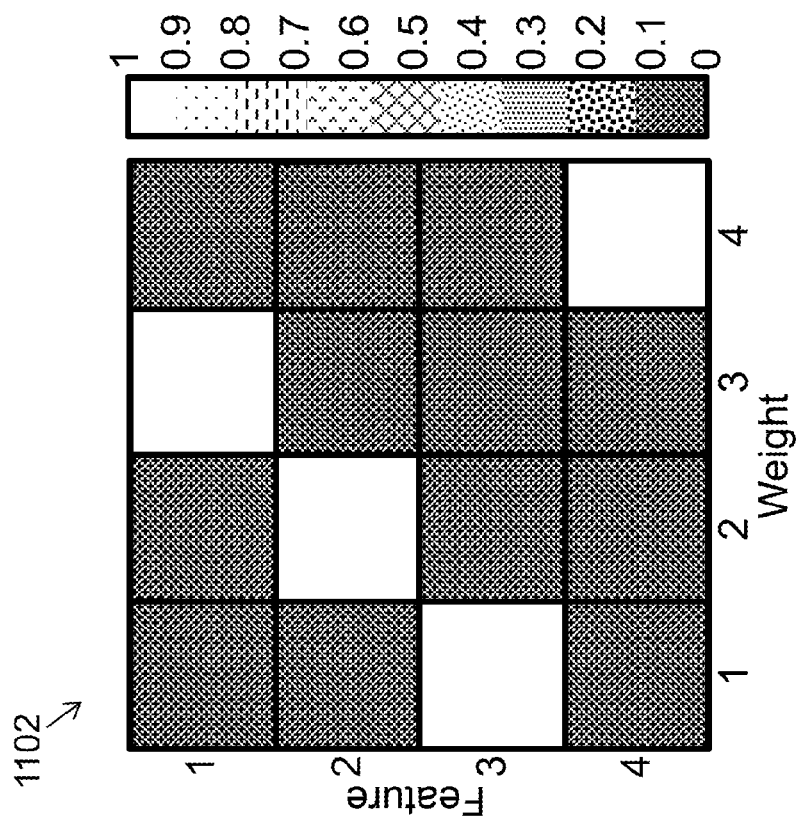
FIG. 11D is a matrix representation of peak synaptic conductances for creating differential tuning, after training, according to the present invention.
Figure 11C:
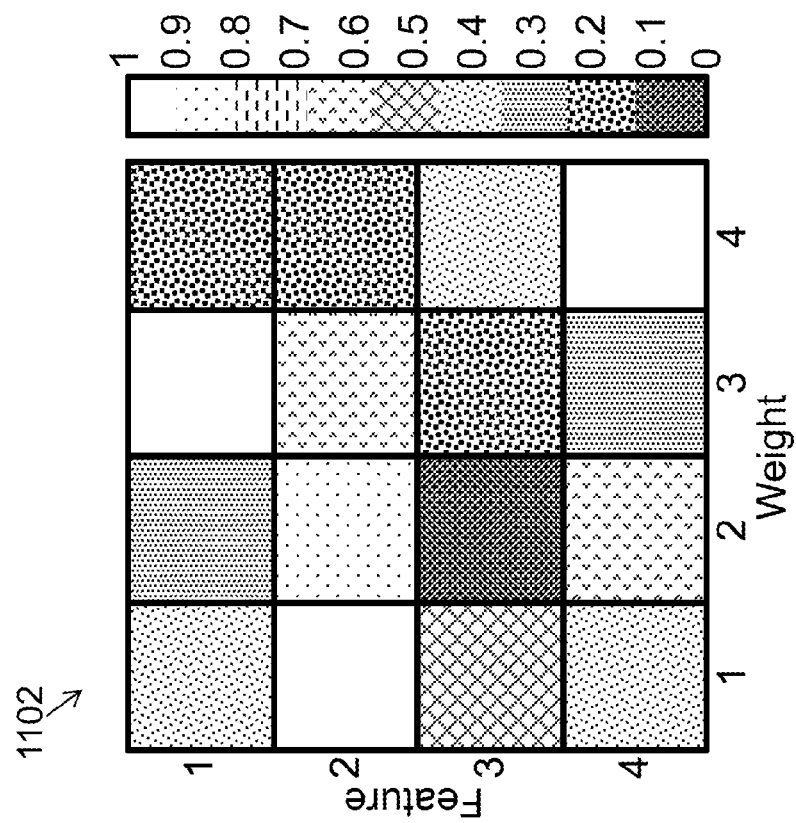
FIG. 11C is a matrix representation of peak synaptic conductances for creating differential tuning, before training, according to the present invention.

FIGS. 11A-11D provide an example of differential tuning with network representations 1100 (FIGS. 11A and 11B) and matrix representations 1102 (FIGS. 11C and 11D) of peak synaptic conductances for creating differential tuning. FIGS. 11A and 11C are representations before training, while FIGS. 11B and 11D are representations after training. If a learning rule can perform differential tuning, it would be expected that weights would become more tuned and less similar. For each input pattern, a winning feature detector neuron would come to encode it, leading to "orthogonal" feature detectors. However, without proper competition, a feature detector neuron could come to encode all input patterns. Again, tuning and dissimilarity were measured before and after input presentations (i.e., training). In FIGS. 11C and 11D, the map index runs along the horizontal axis, while the input index descends along the vertical axis. In FIGS. 11A and 11C, all feature detector (map) neurons (1104, 1106, 1108, and 1110) are weakly tuned to all input neurons (1112, 1114, 1116, and 1118). Furthermore, the first 1104, second 1106, and third 1108 feature detector (map) neurons respond well to feature 2 (input neuron 2) 1114. In FIGS. 11B and 11D, after the presentation of input patterns with lateral spread, each feature detector (map) neuron codes a unique input neuron. Tuning and dissimilarity increases. Throughout each of the pertinent figures, heavy circles represent input neurons, and light circles represent feature detector neurons. Additionally, heavy lines represent large weights between neurons, and light lines represent small weights between neurons.

(3.2.4) Results of Tests of Differential Tuning: Learning Feature Detectors

With respect to differential tuning, all learning laws create differential tuning between feature detector (map) neurons 1, 2, and 3, which are all initially responsive to feature 2 (second input neuron). Both Instar and STDP learning rules are also able to increase tuning and dissimilarity. Between these two, Instar learning is more effective with weights more tuned but less dissimilar. Furthermore, STDP final weights do not reflect the lateral spread in the input. For example, feature detector (map) neuron 2 is responsive to feature 2 (second input neuron) but not responsive to feature 1 (first input neuron) even though those input neurons are highly correlated. Instar STDP, unfortunately, decreased tuning and separation. Lastly, no one feature detector neuron comes to encode all input features because of sufficient competitive dynamics.

Figures 12A, 12B:
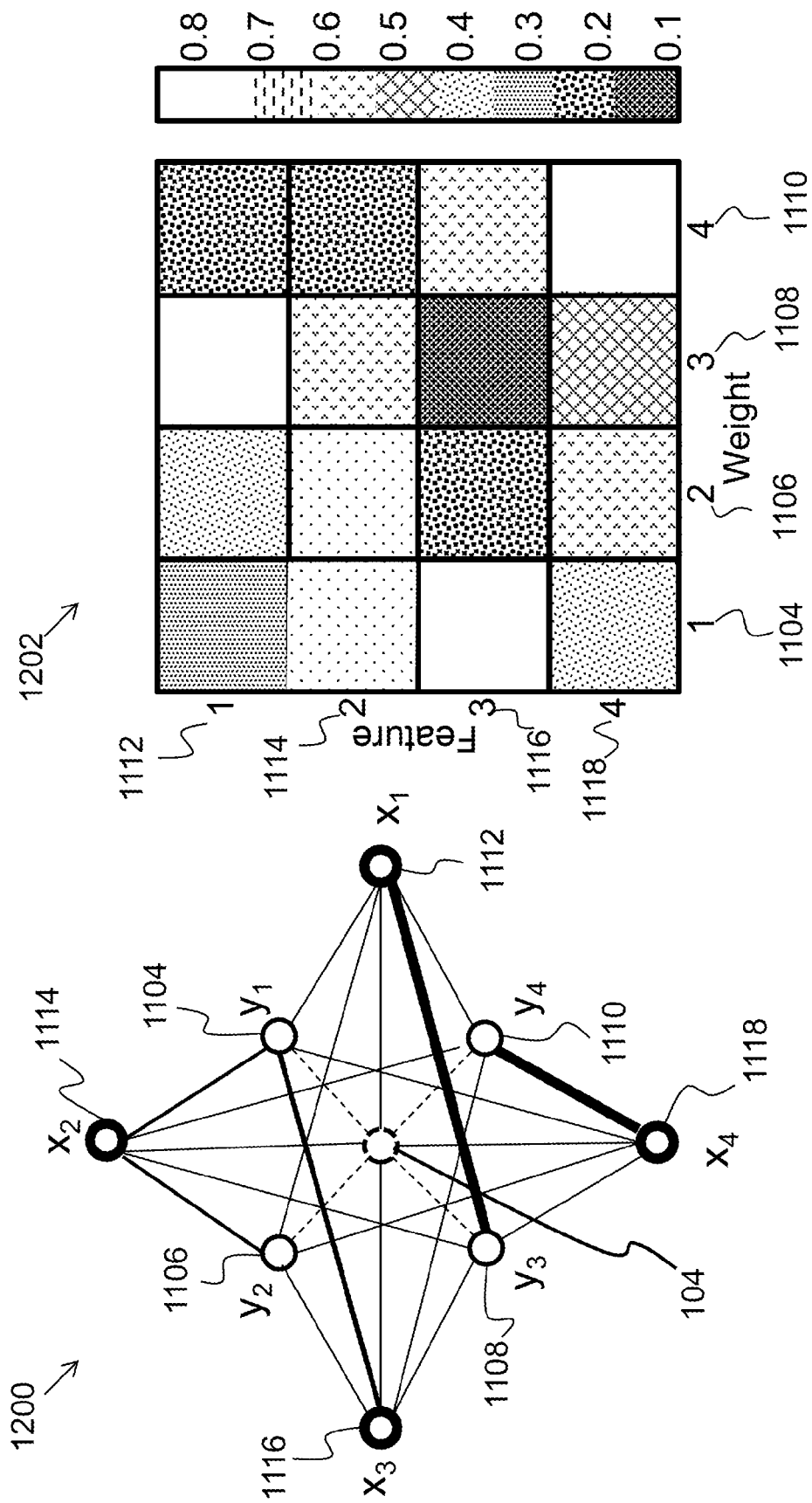
FIG. 12A is a network representation of peak synaptic conductances for differential tuning results for Instar learning according to the present invention.
FIG. 12B is a matrix representation of peak synaptic conductances for differential tuning results for Instar learning according to the present invention.

FIGS. 12A and 12B illustrate a network representation 1200 and a matrix representation 1202, respectively, of differential tuning results using Instar learning, where tuning=0.0996 and dissimilarity=0.3672. As shown, tuning and dissimilarity has increased, as indicated by greater variation in shading in the matrix representation 1202 and changes in the weights of the connecting lines in the network representation 1200. Feature detector (map) neuron 1 1104 is now most sensitive to feature 2 (second input neuron) 1114; feature detector (map) neuron 2 1106 is most sensitive to feature 2 (second input neuron) 1114; feature detector (map) neuron 3 1108 is most sensitive to feature 1 (first input neuron) 1112; and feature detector (map) neuron 4 1110 is most sensitive to feature 4 (fourth input neuron) 1118. However, competition between feature detector (map) neuron 1 1104 and feature detector (map) neuron 2 1106 would cause feature detector (map) neuron 1 1104 to fire for input feature 3 (third input neuron) 1116, to which no other neuron is as well tuned.

Figures 13A, 13B:
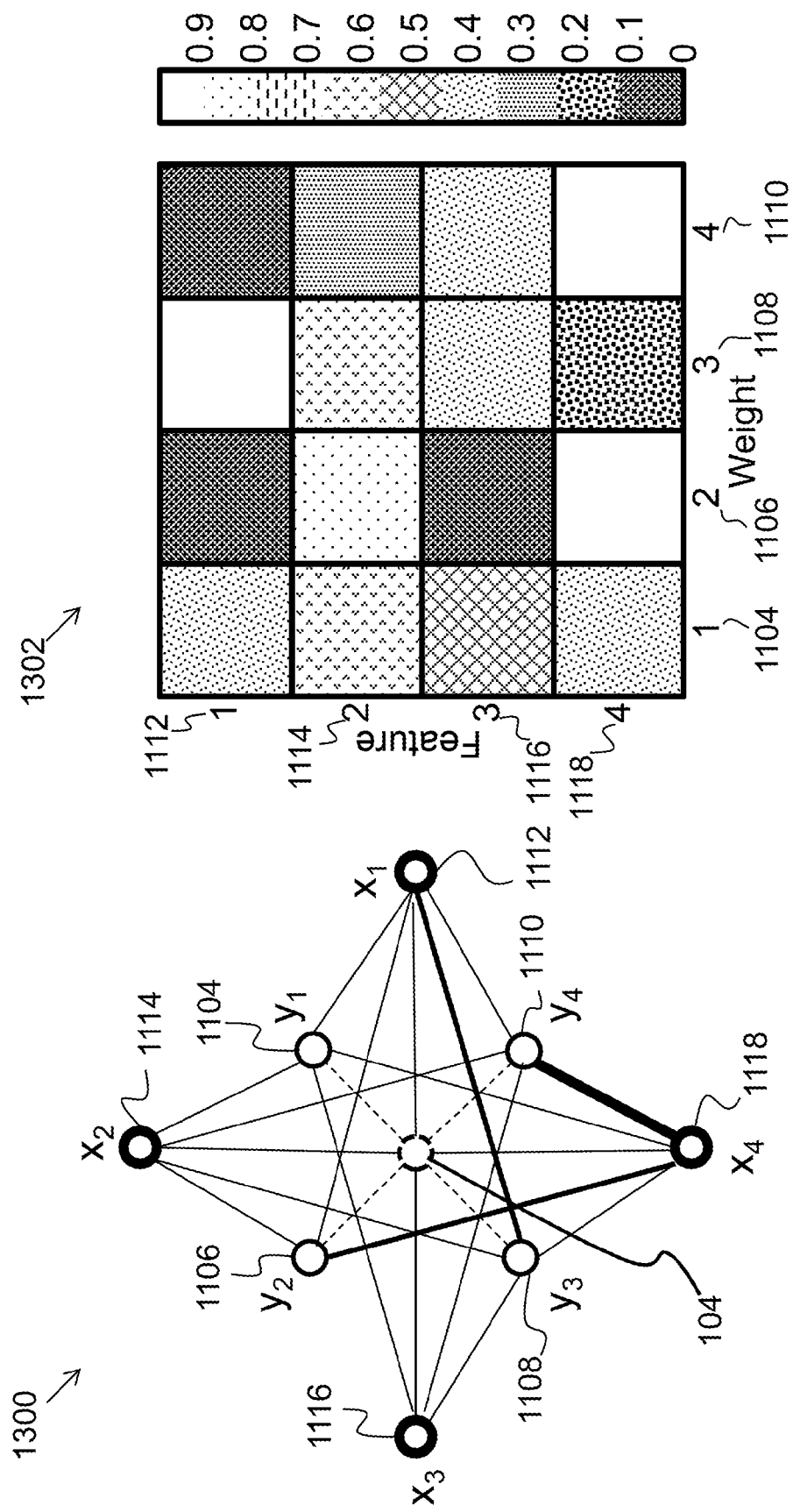
FIG. 13A is a network representation of peak synaptic conductances for differential tuning results for STDP learning according to the present invention.
FIG. 13B is a matrix representation of peak synaptic conductances for differential tuning results for STDP learning according to the present invention.

FIGS. 13A and 13B illustrate a network representation 1300 and a matrix representation 1302, respectively, of differential tuning results using STDP learning, where tuning=0.0762 and dissimilarity=0.4360. Tuning and dissimilarity has increased in this test. Feature detector (map) neuron 1 1104 is now most sensitive to feature 2 (second input neuron) 1114; feature detector (map) neuron 2 1106 is now most sensitive to feature 2 (second input neuron) 1114; feature detector (map) neuron 3 1108 is now most sensitive to feature 1 (first input neuron) 1112; and feature detector (map) neuron 4 1110 is now most sensitive to feature 4 (fourth input neuron) 1118. However, competition between feature detector (map) neuron 1 1104 and feature detector (map) 2 1106 would cause feature detector (map) neuron 1 1104 to fire for input feature 3 (third input neuron) 1116, to which no other neuron is as well tuned. Again, lateral spread of input patterns is not reflected in the final weights.

Figures 14A, 14B:
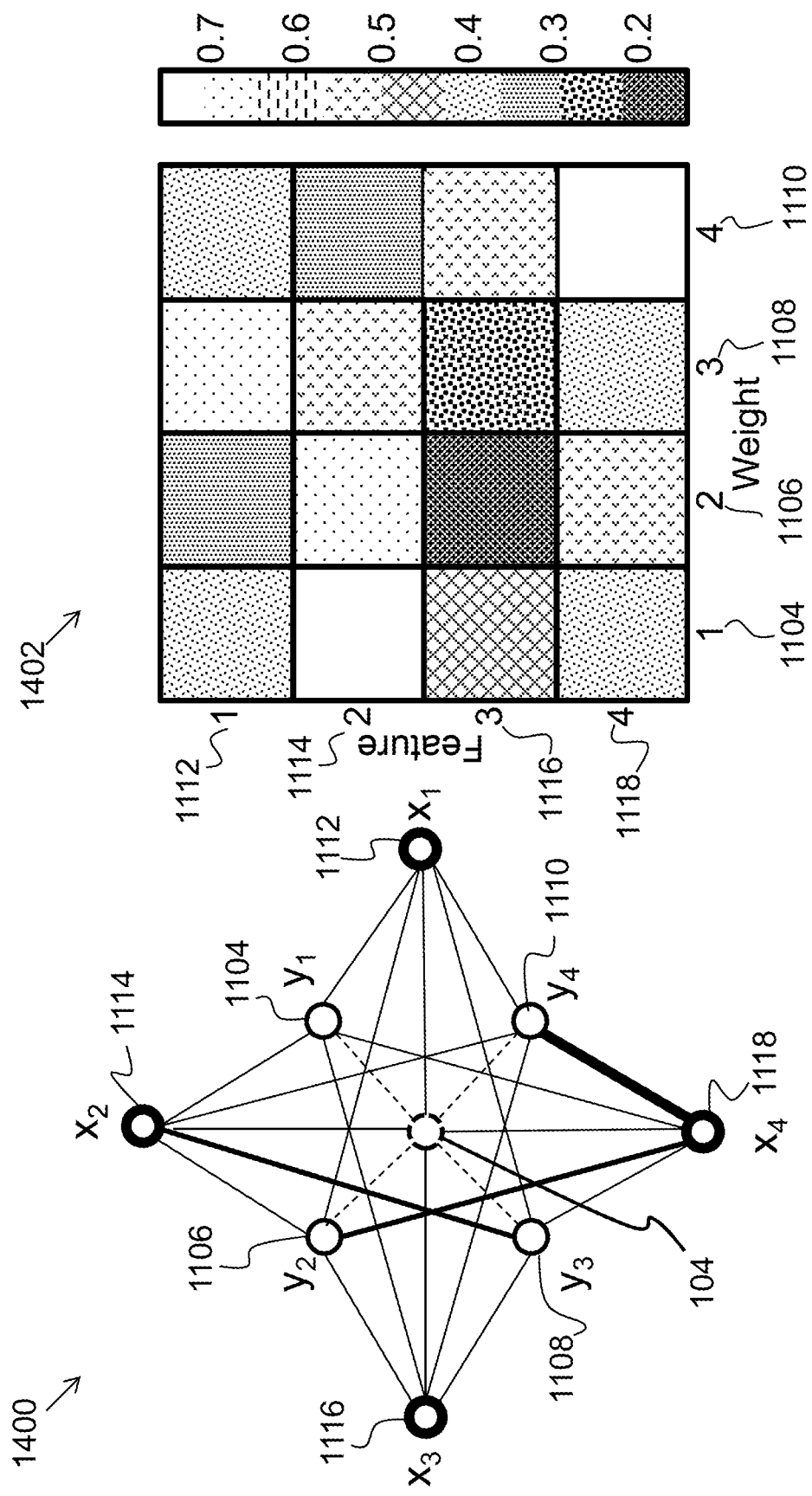
FIG. 14A is a network representation of peak synaptic conductances for differential tuning results for Instar STDP learning according to the present invention.
FIG. 14B is a matrix representation of peak synaptic conductances for differential tuning results for Instar STDP learning according to the present invention.

FIGS. 14A and 14B illustrate a network representation 1400 and a matrix representation 1402, respectively, of differential tuning results using Instar STDP learning, where tuning=0.0470 and dissimilarity=0.1801. Tuning and dissimilarity have both decreased in this test. Feature detector (map) neuron 1 1104 is now most sensitive to feature 2 (second input neuron) 1114; feature detector (map) neuron 2 1106 is now most sensitive to feature 2 (second input neuron) 1114; feature detector (map) neuron 3 1108 is now most sensitive to feature 1 (first input neuron) 1112; and feature detector (map) neuron 4 1110 is now most sensitive to feature 4 (fourth input neuron) 1110. Competition between feature detector (map) neuron 1 1104 and feature detector (map) neuron 2 1106 would cause feature detector (map) neuron 1 1104 to fire for input feature 3 (third input neuron) 1116, but feature detector (map) neuron 4 1110 is even more tuned for that input, effectively removing feature detector (map) neuron 1 1104 from ever winning.

Figure 15:
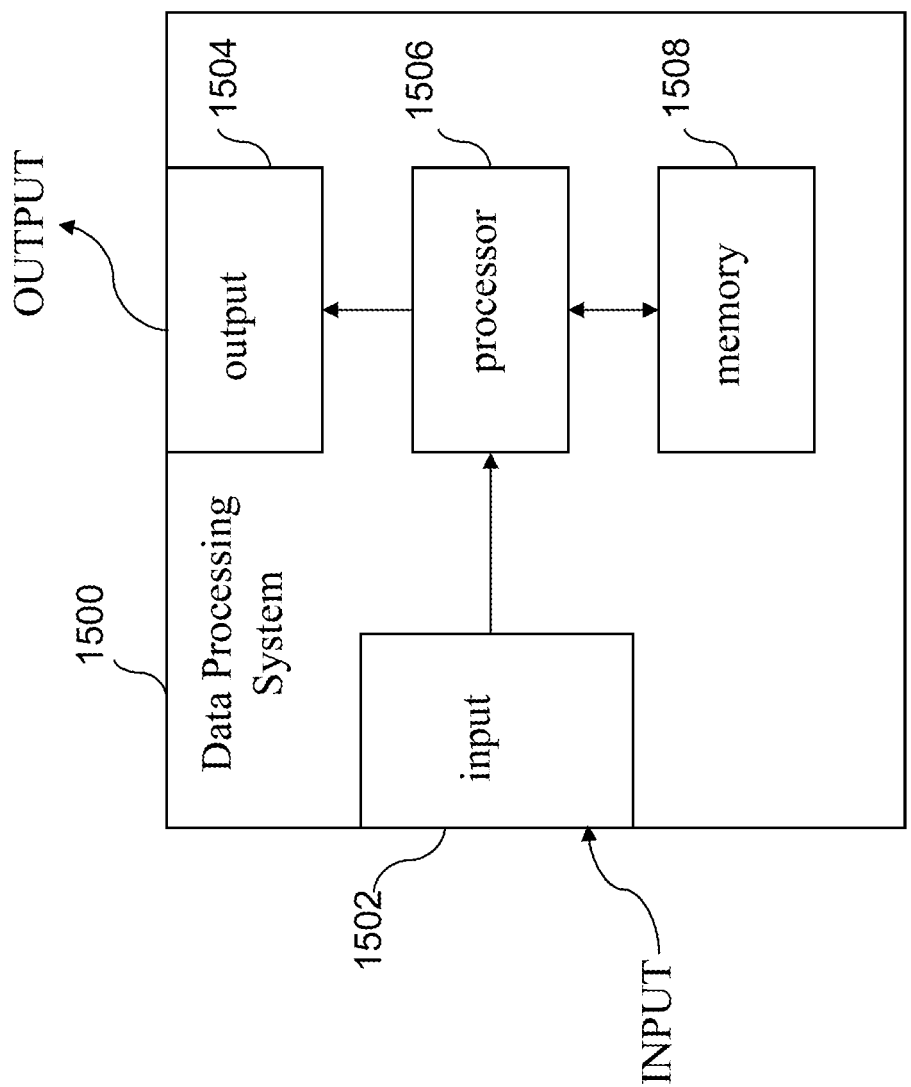
FIG. 15 is an illustration of a data processing system according to the present invention.

FIG. 15 illustrates a block diagram depicting components of a data processing system 1500 (e.g., computer) incorporating the operations of the method described above and throughout the specification. The method utilizes a data processing system 1500 for storing computer executable instructions (or instruction means) for causing a processor to carry out the operations of the above described method. The data processing system 1500 comprises an input 1502 for receiving information from a user. Information received may include input from devices such as cameras, scanners, keypads, keyboards, microphone, other peripherals such as storage devices, other programs, etc. The input 1502 may include multiple "ports." An output 1504 is connected with a processor 1506 (or processors) for providing information for transmission to other data processing systems, to storage devices, to display devices such as monitors, to generating information necessary for delivery, and to other mechanisms for presentation in user-usable forms. The input 1502 and the output 1504 are both coupled with the processor 1506, which may be a general-purpose computer processor or a specialized processor designed specifically for use with the present invention. The processor 1506 is coupled with a memory 1508 to permit storage of data and software to be manipulated by commands to the processor 1506. The memory 1508 includes instructions such that when the instructions are executed, the processor 1506 (or processors) performs operations described above and throughout the specification.

Figure 16:
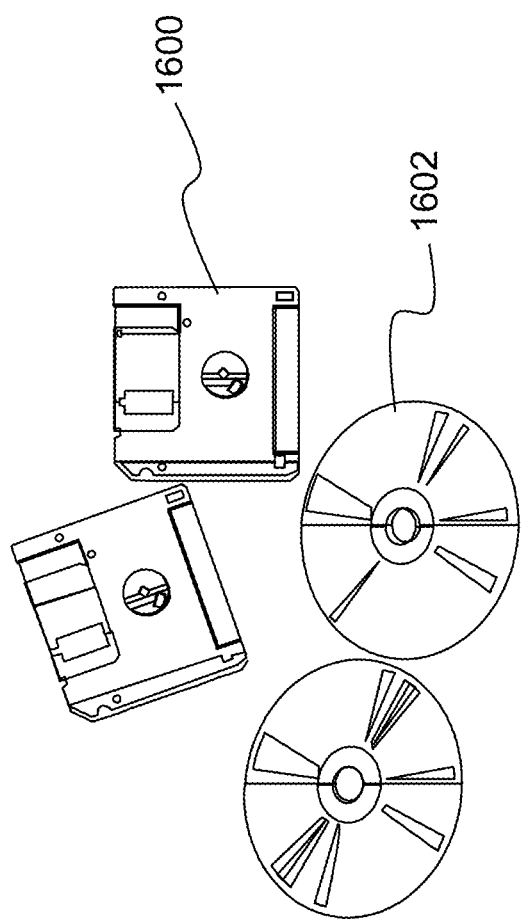
FIG. 16 is an illustration of a computer program product according to the present invention.

An illustrative diagram of a computer program product embodying the present invention is depicted in FIG. 16. As a non-limiting example, the computer program product is depicted as either a floppy disk 1600 or an optical disk 1602. However, as mentioned previously, the computer program product generally represents computer readable code (i.e., instruction means or instructions) stored on any compatible computer readable medium.

(3.3) Implementation

Although learning feature detectors has been shown in both rate- and spike-coding domains, the present invention shows that the functional properties of rate coded models can be systematically translated into the spiking domain, opening the door for automated conversion across domains. Across both testbed networks, Instar learning proved to be the most stable and able to create differential tuning.

(3.3.1) Neuronal Dynamics

Neuron dynamics are either in the rate- or spike-coded domain. Instar learning was originally defined in the rate-coded domain (see Literature Reference No. 12), with neuron dynamics typically given by the shunting membrane equation (see Literature Reference No. 13), although alternate formulations are also possible (see Literature Reference No. 24). STDP learning can either be rate—(see Literature Reference No. 20) or spike-coded (see Literature Reference No. 28). Instar STDP learning has also been shown in the spiking domain but with complex dynamics (see Literature Reference No. 7), such as Hodgkin-Huxley equations.

Although there are several alternatives to Hodgkin-Huxley dynamics (see Literature Reference No. 17), the shunting membrane equation was continued in the present invention, and hard resets of membrane voltage were added. Thus, in the second feature detector layer, neurons with membrane voltages $y_j$, where j denotes the position in the feature detector layer, combine excitatory $E_j$ and inhibitory inputs $I_j$ within an on-center (excitatory) off-surround (inhibitory) shunting equation:

$$\varepsilon_y \left( \frac{dy_j}{dt} \right) = -A(y_i - B) + (C - y_j)E_j - (y_j + D)I_j. \qquad (1)$$

$\varepsilon_y$, A, B, C and D are parameters described below, and $E_j$ and $I_j$ are described below in equations 3-5 and 6-8. Each of the above and below equations are differential equations, therefore, their values are integrated at each time step. To add spiking dynamics, membrane voltages $y_j$ are reset after crossing a firing threshold defined as follows:

$$y_j = \alpha, \text{ when } y_j \geq \beta, \qquad (2)$$

Where α and β are constants described below.

Equation 1 represents rate-coded activation values; equation 2 represents spike-coded spiking membrane potential values. Rate-coded activations are continuously integrated which can lead to high power consumption when implemented in hardware. In contrast, spike-coded membrane potentials are reset which can lead to low power consumption when implemented in hardware.

A neuron's excitatory on-center input is composed of feed-forward (f), feed-back (b), and tonic terms (t), all of which are scaled by constants:

$$E_j = E_j^f + E_j^b + E^t \qquad (3)$$

$$E_j^f = \kappa_f \sum_{i=1}^{N} w_{ij}(h_i g_{ij}) \qquad (4)$$

$$E_j^b = \kappa_b(h_j g_{jj}) \qquad (5)$$

Constants κ adjust the relative influence of each excitatory term. N represents the number of input neurons. $E_j^f$ is the bottom up excitation from the input (x) to the feature detector (y) layer. $w_{ij}$ and $h_i g_{ij}$ represent the synaptic weight and efficacy terms respectively between pre- and post-synaptic neurons; pre-synaptic neurons are in the input layer while post-synaptic neurons are in the feature detector layer. Self-excitation ($E_j^b$) is modeled with recurrent synapses, but other mechanisms are also possible (e.g. Ca+2 dynamics). $E^t$ represents a tonic drive in the feature detector layer (e.g., a constant such as 2.5); it is independent of position in the feature detector layer. A neuron's inhibitory off-surround input is composed of feed-forward (f) and feedback (b) terms, all of which are scaled by constants:

$$I_j = I^f + I_j^b \qquad (6)$$

$$I^f = \lambda_f \sum_{i=1}^{N}(h_j g_{ij}) \qquad (7)$$

$$I_j^b = \lambda_b \sum_{\substack{j'=1 \\ j' \neq j}}^{M}(h_j g_{j'j}) \qquad (8)$$

Constants λ adjust the relative influence of each inhibitory term. $I^f$ is the bottom up inhibition from the input (x) to the map (y) layer. j' is the set of category layer neurons that are different from j. Competition between map neurons, $I_j^b$, is modeled with recurrent synapses. M represents the number of feature detector neurons, also referred to as map neurons or category neurons.

Shunting dynamics are known to provide automatic gain control, normalization, and noise suppression (see Literature Reference No. 13). Furthermore, with appropriate substitutions, equations 1 and 2 are equivalent to the Conductance Based Integrate and Fire Neuron Model (see Literature Reference No. 31), commonly used with STDP learning as shown in the table below:

| Shunting Equation | COBA | Bio-physical Meaning |
|---|---|---|
| $\varepsilon_y$ | τ | Membrane capacitance |
| $y_j$ | V | Membrane voltage |
| A | 1 | Leak conductance |
| B | $V_{rest}$ | Resting voltage (e.g., for Na channels) |
| C | $E_{ex}$ | Excitatory reversal potential (e.g., for K channels) |
| $E_j$ | $g_{ex}$ | Excitatory conductance (e.g., AMPA inputs) |
| D | $E_{inh}$ | Inhibitory reversal potential (e.g., for Cl channels) |
| $I_j$ | $g_{inh}$ | Inhibitory conductance (e.g., GABA inputs) |
| β | $V_{thresh}$ | Firing threshold |
| α | $V_{rest}$ | Reset membrane voltage |

(3.3.2) Synaptic Dynamics

Rate-coded synapses use the analog values of the pre-synaptic neuron's activation value. Spike-coded synapses use spikes, with an analog trace of pre-synaptic firing at the postsynaptic neuron. The former requires higher bandwidth to transmit than the latter. Rate-coded models typically require the transmission of analog activities between pre- and post-synaptic neurons. However, this is counter to current hardware requirements. Digital transmission of spikes and hard resets of membrane voltage, on the other hand, do not provide a memory of pre-synaptic activity to post-synaptic neurons.

To address this, analog traces of pre-synaptic firing at the post-synaptic site were used, based on a simple model of synaptic conductances (see Literature Reference No. 3) below:

$$g_{pq} = G_{reset}, \qquad (9)$$

when pre-synaptic neuron p spikes at time t $$\varepsilon_g(dg_{pq}/dt) = -g_{pq}/T_G \qquad (10)$$

where $\varepsilon_g$ is an integration constant and p(q) denotes the position in the pre-(post) synaptic layer. Input layer neurons (x) use index i while category layer (feature detector layer) neurons (v) use index j. Thus, $g_{ij}$ is between the input and categorization layers, while $g_{jj}$ is feedback within the categorization layer. $G_{reset}$ represents the maximum channel conductance, and $T_G$ represents the time constant of the channel. As long as pre-synaptic firing rates across the input layer are bounded and do not saturate, analog responses are available at the post-synaptic site. Alternate models of synaptic conductance which increment $g_{pq}$ with each spike (see Literature Reference No. 31) can also be used. These models can provide a more graded response at the post-synaptic site but at the cost of added complexity and similar assumptions about pre-synaptic firing rates and distributions.

Rate coded synapses occasionally use depressing synapses (see Literature Reference No. 34). However, learning with depressing synapses is rarely used. Spike-coded synapses often use short-term plasticity, which can simulate both depression and facilitation. Previous work on Instar STDP learning in the spiking domain used slightly more elaborate models of receptor dynamics (see Literature Reference Nos. 7 and 30). A short term plasticity (STP), a common feature among spiking models (see Literature Reference No. 23), was also added in the present invention. Simple receptor dynamics ($g_{pq}$, see equations 9-10) are modulated by STP (see Literature Reference No. 23):

$$h_p = \mu u_p a_p \qquad (11)$$

$$du_p/dt = (U-u_p)/T_F + U(1-u_p)\delta(t-t_{p,spike}) \qquad (12)$$

$$da_p/dt = (1-a_p)/T_D - u_p a_p \delta(t-t_{p,spike}), \qquad (13)$$

where $\mu$ is a scaling constant, $u_p$ represents the fraction of synaptic resources used by each spike, and $a_p$ is the amount of available resources. As before, p denotes pre-synaptic neuron. Further details on how synaptic resources are consumed and recover with each spike can be found in Literature Reference No. 23. STP enables greater control of post-synaptic potentials by facilitating or suppressing the release of neurotransmitter on a shorter timescale than synaptic weight change. They also provide non-linear signal functions necessary for recurrent competitive fields described below.

(3.3.3) Competition Dynamics

Competition is crucial for learning feature detectors. Without it, all post-synaptic neurons would converge to the most frequently occurring input pattern. The most extreme form of competition is winner-take-all (WTA). WTA has been formally proven to be more powerful computationally than other nonlinear operations, such as thresholding (see Literature Reference No. 21). For both the rate- and spike-coded domain, winners are typically chosen algorithmically (see Literature Reference Nos. 6 and 14). However, recurrent competitive fields (see Literature Reference No. 13) provide WTA dynamics even in the spiking domain (see Literature Reference No. 26). The feedback terms in equations 5 and 8 provide the dynamics for a recurrent competitive field.

(3.3.4) Learning Dynamics

Rate-coded synapses use Instar learning which is gated by post-synaptic activity values ($y_j$). Spike-coded synapses use Instar learning which is gated by post-synaptic spikes $\delta(t-t_{j,spike})$. Spike-code synapses can also use STDP or Instar STDP. Rate-coded and spike-coded Instar learning rules are functionally similar, and the present invention creates a spike-coded Instar.

In all equations below R represents a scalar learning rate (e.g., 0.75) and $\delta(t-t_{j,spike})$ is a delta function at time $t-t_{j,spike}$ acting as a gate where $t_{j,spike}$ is the time of post-synaptic spiking. As can be appreciated by one skilled in the art, the delta function can also be replaced by monotonically decreasing functions, such as exponential decay or alpha functions.

Instar learning was adapted to the spiking domain to track pre-synaptic conductances with spike-based gating:

$$\epsilon_w\left(\frac{dw_{ij}}{dt}\right) = R(g_{ij} - w_{ij})\delta(t-t_{j,spike}), \qquad (14)$$

where $\epsilon_w$ is an integration rate. Because pre-synaptic efficacies contain an analog history of pre-synaptic firing (see above), weights converge to a time-weighted average of pre-synaptic activity. Weights cannot become negative or grow unbounded, because pre-synaptic conductances are similarly bounded.

STDP learning was implemented according to Literature Reference No. 29, where $F(\Delta t_{ij})$ represents the STDP curve as a function of the difference in time between pre (i) and post (j) synaptic firing as follows:

$$\epsilon_w(dw_{ij}/dt) = RF(\Delta t_{ij}) \qquad (15)$$

When $\Delta t_{ij} < 0$ (>0), meaning the pre-synaptic neuron fired before (after) the post-synapitc neuron, F is greater than (less than) 0 causing a weight increase (decrease) (see Literature Reference No. 29). Hard bounds limit negative or unbounded weights. Other formulations were also tried (see Literature Reference No. 11) and yielded similar results.

Instar STDP learning rule (see Literature Reference No. 8) was adapted to track a linearly rescaled STDP curve:

$$\epsilon_w\left(\frac{dw_{ij}}{dt}\right) = R(F'(\Delta t_{ij}) - w_{ij})\delta(t-t_{j,spike}) \qquad (16)$$

$$F'(\Delta t_{ij}) = vF(\Delta t_{ij}) + \xi \qquad (17)$$

As originally stated, Instar STDP tracks an STDP curve created by multiplying pre-synaptic conductances with a function of post-synaptic membrane potentials. $F(\Delta t_{ij})$ above, however, uses exponentially decaying traces to create an STDP curve (see Literature Reference No. 29). Linearly rescaling the STDP curve stretches its range while preventing negative weights. Unbounded weights are not possible because learning stops when $w_{ij}$ reaches the maximum value of F'.

(3.3.5) Measures for Tuning and Similarity

To measure distance between two weight vectors, a and b, the cosine distance was used because it is dimensionless and bounded in [0,1]:

$$d(a, b) = 1 - \frac{a \cdot b}{\|a\|\|b\|} \qquad (18)$$

where $\|\bullet\|$ is the L2 norm.

The tuning of one weight vector ($T_j$) was then measured by the cosine distance between it and a vector of all ones ($1_N$, where N is the number of input layer neurons), which represents an unbiased weight vector. M represents the number of category layer neurons. As a weight vector becomes more tuned, this distance increases. The tuning of all weight vectors was the average of each weight's tuning:

$$T_j = d(w_j, 1_N) \qquad (19)$$

$$T = \frac{1}{M}\sum_{j=1}^{M} T_j. \qquad (20)$$

Other measures are also possible (e.g. coefficient of variation, entropy, tuning depth, etc.).

The similarity between two weights can also be measured by the cosine distance. The similarity across all weights is then the average of the upper triangle of the pair wise distance matrix:

$$D = \frac{1}{C_2^M}\sum_{i=1}^{M}\sum_{j=i+1}^{M} d(w_i, w_j), \qquad (21)$$

where $C_2^M$ is the binomial coefficient of M and 2. Other measures are also possible (e.g. correlation, mutual information, area of overlap in tuning curves, etc.).

(3.3.6) Parameter Values

To mitigate the effect of different learning rate values per learning rule, the following process was implemented. Simulations were run with Instar learning, and the maximum absolute weight change across all map neurons was noted. Then STDP and Instar STDP learning simulations were run with learning rates that led to maximum absolute weights changes of less than or equal to 10% of the value from Instar learning. This allows one to study the "direction" of change in feature detectors while discounting the amplitude of this change. This procedure yielded similar results across both testbed networks with STDP learning requiring the highest learning rate and Instar STDP learning with the lowest. Rescaling parameters values for Instar STDP were computed such that the minimum and maximum STDP update values during a simulation were stretched to the unit interval, as shown in the table below.

| Parameter | Value |
|---|---|
| Input Layer | |
| $r_{center}$ | 965 Hz |
| $r_{on\ surround}$ | 266.25 Hz |
| $r_{off\ surround}$ | 35 Hz |
| window length | 250 ms |
| Input Layer Synapse | |
| $\epsilon_g$ | 1 |
| $T_G$ | 4.9080 |
| $G_{reset}$ | 1 |
| $\mu$ | 2 |
| U | 1 |
| $T_F$ | 1 |
| $T_D$ | 1 |
| Feature Detector Layer Neuron | |
| $\epsilon_y$ | 5.4348 |
| A | 1 |
| B | 1.5 |
| C | 1 |
| D | 1 |
| $\alpha$ | 0.749 |
| $\beta$ | 0 |
| $\kappa_f$ | 3.75 |
| $\kappa_b$ | 0.5 |
| $E^t$ | 2.5 |
| $\lambda_f$ | 0.3221 |
| $\lambda_b$ | 31.25 |
| Feature Detector Layer Synapse | |
| $\epsilon_g$ | 1 |
| $T_G$ | 4.9080 |
| $G_{reset}$ | 1 |
| $\mu$ | 1 |
| U | 0.049 |
| $T_F$ | 1790 |
| $T_D$ | 399 |
| Learning | |
| $R_{Instar}$, Stability | 0.05 |
| $R_{STDP}$, Stability | 0.9 |
| $R_{Instar\ STDP}$, Stability | 0.006 |
| $R_{Instar}$, Differential | 0.05 |
| $R_{STDP}$, Differential | 0.1187 |
| $R_{Instar\ STDP}$, Differential | 0.0045 |
| STDP trace parameters | |
| $A_+$ | 0.005 |
| $A_-$ | 0.005 |
| $T_+, T_-$ | 0.0500 |
| Instar STDP parameters | |
| $\upsilon$ | 7.4088 |
| $\xi$ | 0.2074 |

What is claimed is:

1. A system for feature detection with spiking dynamics, the system comprising:
   one or more processors and a memory having instructions such that when the instructions are executed, the one or more processors perform operations of:
   receiving an input pattern in a rate-coded domain comprising a plurality of features;
   translating the input pattern in the rate-coded domain into a spike-coded representation of the input pattern;
   transmitting the spike-coded representation of the input pattern to a feature detector layer of a feature detector network comprising a set of feature detector neurons having input weights comprising excitatory inputs and inhibitory inputs such that the feature detector neurons are arranged in an on-center (excitatory) off-surround (inhibitory) manner;
   activating of the set of feature detector neurons in the feature detector layer;
   competing of the set of feature detector neurons in the feature detector layer for the feature detector neuron whose input weights encode the input pattern best, such that each feature detector neuron in the set of feature detector neurons only excites itself, receives tonic excitation, and receives inhibition from all feature detector neurons except itself; and
   updating the input weights which encode frequently seen input patterns according to a learning rule selected from the group consisting of Instar learning, spike-timing-dependent plasticity (STDP) learning, and Instar STDP learning.

2. The system as set forth in claim 1, wherein within the feature detector layer, feature detector neurons with membrane voltages $y_j$, where j denotes the position in the feature detector layer, combine excitatory $E_j$ and inhibitory inputs $I_j$, within an on-center (excitatory) off-surround (inhibitory) shunting equation with reset for spiking dynamics according to the following:

$$\varepsilon_y\left(\frac{dy_j}{dt}\right) = -A(y_i - B) + (C - y_j)E_j - (y_j + D)I_j,\ y_j = \alpha,\ \text{when}\ y_j \geq \beta$$

where A represents a leak conductance parameter, B represents a resting voltage parameter, C represents an excitatory reversal potential parameter, D represents an inhibitory reversal potential parameter, a represents a reset membrane voltage parameter, β represents a firing threshold parameter, $\epsilon_y$ represents a membrane capacitance parameter, and t represents time, wherein within the feature detector layer a feature detector neuron's excitatory input $E_j$ comprises feed-forward (f), feed-back (b), and tonic (t) terms, which are scaled by constants according to the following:

$$E_j = E_j^f + E_j^b + E^t,$$

-continued $$E_j^f = \kappa_f \sum_{i=1}^{N} w_{ij}(h_i g_{ij}), \text{ and}$$

$$E_j^b = \kappa_b(h_j g_{jj}),$$

where j denotes a position in the feature detector layer, constants κ adjust the relative influence of each excitatory term, $E_j^f$ represents a bottom-up excitation from an input layer of the feature detector network to the feature detector layer, N is a number of number of input neurons in the feature detector network, $w_{ij}$ and $h_i g_{ij}$ represent synaptic weight and efficacy terms, respectively, between pre-synaptic feature detector neurons in an input layer of the feature detector network and post-synaptic feature detector neurons in the feature detector layer, wherein self-excitation is denoted by $E_j^b$, and wherein $E^t$ represents a tonic drive in the feature detector layer that is independent of position in the feature detector layer.

3. The system for feature detection with spiking dynamics as set forth in claim 2, wherein a feature detector neuron's inhibitory input $I_j$ comprises feed-forward (f) and feed-back (b) terms, which are scaled by constants according to the following:

$$I_j = I^f + I_j^b$$

$$I^f = \lambda_f \sum_{i=1}^{N} (h_i g_{ij})$$

$$I_j^b = \lambda_b \sum_{\substack{j'=1 \\ j' \neq j}}^{M} (h_{j'} g_{j'j})$$

where constants λ adjust the relative influence of each inhibitory term, $I^f$ is a bottom-up inhibition from the input layer to the feature detector layer, N is a number of input neurons, M is a number of feature detector neurons, and wherein competition between feature detector neurons, $I_j^b$, is modeled with recurrent synapses.

4. The system for feature detection with spiking dynamics as set forth in claim 3, wherein the one or more processors perform an operation of adapting Instar learning with spiking dynamics according to the following:

$$\epsilon_w \left( \frac{d w_{ij}}{dt} \right) = R(g_{ij} - w_{ij}) \delta(t - t_{j,spike}),$$

where $\epsilon_w$ is an integration rate, R represents a scalar learning rate, $\delta(t-t_{j,spike})$ represents a delta function at time $t-t_{j,spike}$ acting as a gate where $t_{j,spike}$ is the time of post-synaptic spiking, and t represents time.

5. A computer-implemented method for feature detection with spiking dynamics, comprising an act of:
causing a data processor to execute instructions stored on a non-transitory memory such that upon execution, the data processor performs operations of:
receiving an input pattern in a rate-coded domain comprising a plurality of features;
translating the input pattern in the rate-coded domain into a spike-coded representation of the input pattern;
transmitting the spike-coded representation of the input pattern to a feature detector layer of a feature detector network comprising a set of feature detector neurons having input weights comprising excitatory inputs and inhibitory inputs such that the feature detector neurons are arranged in an on-center (excitatory) off-surround (inhibitory) manner;
activating of the set of feature detector neurons in the feature detector layer;
competing of the set of feature detector neurons in the feature detector layer for the feature detector neuron whose input weights encode the input pattern best, such that each feature detector neuron in the set of feature detector neurons only excites itself, receives tonic excitation, and receives inhibition from all feature detector neurons except itself; and
updating the input weights which encode frequently seen input patterns according to a learning rule selected from the group consisting of Instar learning, spike-timing-dependent plasticity (STDP) learning, and Instar STDP learning.

6. The method for feature detection with spiking dynamics as set forth in claim 5, wherein within the feature detector layer, feature detector neurons with membrane voltages $y_j$, where j denotes the position in the feature detector layer, combine excitatory $E_j$ and inhibitory inputs $I_j$, within an on-center (excitatory) off-surround (inhibitory) shunting equation with reset for spiking dynamics according to the following:

$$\epsilon_y \left( \frac{dy_j}{dt} \right) = -A(y_i - B) + (C - y_j)E_j - (y_j + D)I_j, \; y_j = \alpha, \text{ when } y_j \geq \beta$$

where A represents a leak conductance parameter, B represents a resting voltage parameter, C represents an excitatory reversal potential parameter, D represents an inhibitory reversal potential parameter, a represents a reset membrane voltage parameter, β represents a firing threshold parameter, $\epsilon_y$ represents a membrane capacitance parameter, and t represents time, wherein within the feature detector layer a feature detector neuron's excitatory input $E_j$ comprises feed-forward (f), feed-back (b), and tonic (t) terms, which are scaled by constants according to the following:

$$E_j = E_j^f + E_j^b + E^t,$$

$$E_j^f = \kappa_f \sum_{i=1}^{N} w_{ij}(h_i g_{ij}), \text{ and}$$

$$E_j^b = \kappa_b(h_j g_{jj}),$$

where j denotes a position in the feature detector layer, constants κ adjust the relative influence of each excitatory term, $E_j^f$ represents a bottom-up excitation from an input layer of the feature detector network to the feature detector layer, N is a number of number of input neurons in the feature detector network, $w_{ij}$ and $h_i g_{ij}$ represent synaptic weight and efficacy terms, respectively, between pre-synaptic feature detector neurons in an input layer of the feature detector network and post-synaptic feature detector neurons in the feature detector layer, wherein self-excitation is denoted by $E_j^b$, and wherein $E^t$ represents a tonic drive in the feature detector layer that is independent of position in the feature detector layer.

7. The method for feature detection with spiking dynamics as set forth in claim 6, wherein a feature detector neuron's inhibitory input $I_j$ comprises feed-forward (f) and feed-back (b) terms, which are scaled by constants according to the following:

$$I_j = I^f + I_j^b$$

$$I^f = \lambda_f \sum_{i=1}^{N} (h_i g_{ij})$$

$$I_j^b = \lambda_b \sum_{\substack{j'=1 \\ j' \neq j}}^{M} (h_{j'} g_{j'j})$$

where constants $\lambda$ adjust the relative influence of each inhibitory term, $I^f$ is a bottom-up inhibition from the input layer to the feature detector layer, N is a number of input neurons, M is a number of feature detector neurons, and wherein competition between feature detector neurons, $I_j^b$, is modeled with recurrent synapses.

8. The method for feature detection with spiking dynamics as set forth in claim 7, further comprising an act of adapting Instar learning with spiking dynamics according to the following:

$$\epsilon_w \left( \frac{d w_{ij}}{dt} \right) = R(g_{ij} - w_{ij}) \delta(t - t_{j,spike}),$$

where $\epsilon_w$ is an integration rate, R represents a scalar learning rate, $\delta(t-t_{j,spike})$ represents a delta function at time $t-t_{j,spike}$ acting as a gate where $t_{j,spike}$ is the time of post-synaptic spiking, and t represents time.

9. A computer program product for feature detection with spiking dynamics, the computer program product comprising computer-readable instructions stored on a non-transitory computer-readable medium that are executable by a computer having a processor for causing the processor to perform operations of:
  receiving an input pattern in a rate-coded domain comprising a plurality of features;
  translating the input pattern in the rate-coded domain into a spike-coded representation of the input pattern;
  transmitting the spike-coded representation of the input pattern to a feature detector layer of a feature detector network comprising a set of feature detector neurons having input weights comprising excitatory inputs and inhibitory inputs such that the feature detector neurons are arranged in an on-center (excitatory) off-surround (inhibitory) manner;
  activating of the set of feature detector neurons in the feature detector layer;
  competing of the set of feature detector neurons in the feature detector layer for the feature detector neuron whose input weights encode the input pattern best, such that each feature detector neuron in the set of feature detector neurons only excites itself, receives tonic excitation, and receives inhibition from all feature detector neurons except itself; and
  updating the input weights which encode frequently seen input patterns according to a learning rule selected from the group consisting of Instar learning, spike-timing-dependent plasticity (STDP) learning, and Instar STDP learning.

10. The computer program product for feature detection with spiking dynamics as set forth in claim 9, wherein within the feature detector layer, feature detector neurons with membrane voltages $y_j$, where j denotes the position in the feature detector layer, combine excitatory $E_j$ and inhibitory inputs $I_j$, within an on-center (excitatory) off-surround (inhibitory) shunting equation with reset for spiking dynamics according to the following:

$$\epsilon_y \left( \frac{d y_j}{dt} \right) = -A(y_j - B) + (C - y_j) E_j - (y_j + D) I_j, \, y_j = \alpha, \text{ when } y_j \geq \beta$$

where A represents a leak conductance parameter, B represents a resting voltage parameter, C represents an excitatory reversal potential parameter, D represents an inhibitory reversal potential parameter, $\alpha$ represents a reset membrane voltage parameter, $\beta$ represents a firing threshold parameter, $\epsilon_y$ represents a membrane capacitance parameter, and t represents time, wherein within the feature detector layer a feature detector neuron's excitatory input $E_j$ comprises feed-forward (f), feed-back (b), and tonic (t) terms, which are scaled by constants according to the following:

$$E_j = E_j^f + E_j^b + E^t,$$

$$E_j^f = \kappa_f \sum_{i=1}^{N} w_{ij}(h_i g_{ij}), \text{ and}$$

$$E_j^b = \kappa_b (h_j g_{jj}),$$

where j denotes a position in the feature detector layer, constants $\kappa$ adjust the relative influence of each excitatory term, $E_j^f$ represents a bottom-up excitation from an input layer of the feature detector network to the feature detector layer, N is a number of number of input neurons in the feature detector network, $w_{ij}$ and $h_i g_{ij}$ represent synaptic weight and efficacy terms, respectively, between pre-synaptic feature detector neurons in an input layer of the feature detector network and post-synaptic feature detector neurons in the feature detector layer, wherein self-excitation is denoted by $E_j^b$, and wherein $E^t$ represents a tonic drive in the feature detector layer that is independent of position in the feature detector layer.

11. The computer program product for feature detection with spiking dynamics as set forth in claim 10, wherein a feature detector neuron's inhibitory input $I_j$ comprises feed-forward (f) and feed-back (b) terms, which are scaled by constants according to the following:

$$I_j = I^f + I_j^b$$

$$I^f = \lambda_f \sum_{i=1}^{N} (h_i g_{ij})$$

$$I_j^b = \lambda_b \sum_{\substack{j'=1 \\ j' \neq j}}^{M} (h_{j'} g_{j'j})$$

where constants $\lambda$ adjust the relative influence of each inhibitory term, $I^f$ is a bottom-up inhibition from the input layer to the feature detector layer, N is a number of input neurons, M is a number of feature detector neurons, and wherein competition between feature detector neurons, $I_j^b$, is modeled with recurrent synapses.

12. The computer program product for feature detection with spiking dynamics as set forth in claim 11, further comprising instructions for adapting Instar learning with spiking dynamics according to the following:

$$\epsilon_w \left( \frac{dw_{ij}}{dt} \right) = R(g_{ij} - w_{ij})\delta(t - t_{j,spike}),$$

where $\epsilon_w$ is an integration rate, R represents a scalar learning rate, $\delta(t-t_{j,spike})$ represents a delta function at time $t-t_{j,spike}$ acting as a gate where $t_{j,spike}$ is the time of post-synaptic spiking, and t represents time.

\* \* \* \* \*